United States Patent
Gudger et al.

(10) Patent No.: US 10,742,810 B1
(45) Date of Patent: *Aug. 11, 2020

(54) DIALING A TELEPHONE NUMBER SUBJECT TO AN AUTODIALER PROHIBITION IN A CONTACT CENTER

(71) Applicant: Noble Systems Corporation, Atlanta, GA (US)

(72) Inventors: Teresa Gudger, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,186

(22) Filed: Oct. 19, 2018

Related U.S. Application Data

(63) Continuation of application No. 15/344,645, filed on Nov. 7, 2016, now Pat. No. 10,154,137, which is a continuation of application No. 14/682,337, filed on Apr. 9, 2015, now Pat. No. 9,521,256, which is a continuation of application No. 14/535,620, filed on Nov. 7, 2014, now Pat. No. 9,036,811, which is a continuation-in-part of application No. 14/494,171, filed on Sep. 23, 2014, now Pat. No. 9,037,119, which is a continuation-in-part of application No. 13/958,011, filed on Aug. 2, 2013, now Pat. No. 8,989,814, which is a continuation of application No. 13/902,130, filed on May 24, 2013, now Pat. No. 8,738,076.

(60) Provisional application No. 61/813,713, filed on Apr. 19, 2013.

(51) Int. Cl.
  *H04M 3/51* (2006.01)

(52) U.S. Cl.
  CPC .................. *H04M 3/5158* (2013.01)

(58) Field of Classification Search
  CPC .................................................. H04M 3/5158
  USPC ........................................ 379/265.01–266.1
  See application file for complete search history.

(56) References Cited

U.S. PATENT DOCUMENTS

| | | | | |
|---|---|---|---|---|
| 9,036,811 B1 * | 5/2015 | Gudger | .................. | H04M 3/38 379/266.07 |
| 10,154,137 B1 * | 12/2018 | Koster | ..................... | H04M 3/38 |
| 2003/0231750 A1 * | 12/2003 | Janveja | ................ | G06Q 40/025 379/114.03 |
| 2004/0170258 A1 * | 9/2004 | Levin | .............. | H04M 1/274575 379/88.01 |

(Continued)

*Primary Examiner* — Hemant S Patel

(57) ABSTRACT

A contact center dialing a telephone number to a party, such as a debtor, may discover that the number is subject to a prohibition of being autodialed. In other embodiments, a number that was subject to the prohibition of being autodialed is now discovered to no longer be subject to such prohibition. Various mechanisms defined indicate how such a prohibition associated with the number may be indicated in a dialing list and how various contact center architectures may be used to process the dialing list. In one embodiment, separate sub-systems are used to dial separate dialing lists based on whether the number is to be manually dialed or dialed using an autodialer. In another embodiment, another architecture is used to process an integrated dialing list to determine whether a number is to be manually dialed or autodialed.

20 Claims, 25 Drawing Sheets

(56) References Cited

U.S. PATENT DOCUMENTS

2014/0115486 A1* 4/2014 Benson .................. G06Q 10/06
715/739

* cited by examiner (Note: "0" indicates "false" or "not applicable", "1" indicates "true" or "applicable")

| Row | Skip Trace Number | Confirmed As Correct | Consent Provided | Wireless Number | Wireline Number | Subject To TCPA Autodialer Prohibitions | Comments |
|---|---|---|---|---|---|---|---|
| 1 | 0 | 0 | 0 | 0 | 0 | 0 | Not allowed – can't have same wireless/wireline indication. |
| 2 | 0 | 0 | 0 | 0 | 0 | 1 | Not allowed – can't have same wireless/wireline indication. |
| 3 | 0 | 0 | 0 | 0 | 1 | 0 | Consistent- unknown wireline number is associated with non-metered service. |
| 4 | 0 | 0 | 0 | 0 | 1 | 1 | Wireline number known to be associated with metered service. |
| 5 | 0 | 0 | 0 | 1 | 0 | 0 | Inconsistent indications of Subject to TCPA and Consent. |
| 6 | 0 | 0 | 0 | 1 | 0 | 1 | Consistent indications of Subject to TCPA and Consent |
| 7 | 0 | 0 | 0 | 1 | 1 | 0 | Not allowed – can't have same wireless/wireline indication. |
| 8 | 0 | 0 | 0 | 1 | 1 | 1 | Not allowed – can't have same wireless/wireline indication. |
| 9 | 0 | 0 | 1 | 0 | 0 | 0 | Not allowed – can't have same wireless/wireline indication. |
| 10 | 0 | 0 | 1 | 0 | 0 | 1 | Not allowed – can't have same wireless/wireline indication. |

FIG. 16A

| Row | Skip Trace Number | Confirmed As Correct | Consent Provided | Wireless Number | Wireline Number | Subject To TCPA Autodialer Prohibitions | Comments |
|---|---|---|---|---|---|---|---|
| 11 | 0 | 0 | 1 | 0 | 1 | 0 | Wireline user provided consent |
| 12 | 0 | 0 | 1 | 0 | 1 | 1 | Inconsistent Consent and TCPA indications. |
| 13 | 0 | 0 | 1 | 1 | 0 | 0 | Consistent TCPA and Consent indicators |
| 14 | 0 | 0 | 1 | 1 | 0 | 1 | Inconsistent Consent and TCPA indications. |
| 16 | 0 | 0 | 1 | 1 | 1 | 0 | Not allowed- can't have same wireless/wireline indication. |
| 16 | 0 | 0 | 1 | 1 | 1 | 1 | Not allowed- can't have same wireless/wireline indication. |
| 17 | 0 | 1 | 0 | 0 | 0 | 0 | Not allowed- can't have same wireless/wireline indication. |
| 18 | 0 | 1 | 0 | 0 | 0 | 1 | Not allowed- can't have same wireless/wireline indication. |
| 19 | 0 | 1 | 0 | 0 | 1 | 0 | Conventional wireline billing Arrangement |
| 20 | 0 | 1 | 0 | 0 | 1 | 1 | Metered Service Wireline Number |
| 21 | 0 | 1 | 0 | 1 | 0 | 0 | Inconsistent TCPA and Consent indicators. |
| 22 | 0 | 1 | 0 | 1 | 0 | 1 | Consistent TCPA and Consent indicators |
| 23 | 0 | 1 | 0 | 1 | 1 | 0 | Not allowed- can't have same wireless/wireline indication. |
| 24 | 0 | 1 | 0 | 1 | 1 | 1 | Not allowed- can't have same wireless/wireline indication. |
| 25 | 0 | 1 | 1 | 0 | 0 | 0 | Not allowed- can't have same wireless/wireline indication. |

FIG. 16B

| Row | Skip Trace Number | Confirmed As Correct | Consent Provided | Wireless Number | Wireline Number | Subject To TCPA Autodialer Prohibitions | Comments |
|---|---|---|---|---|---|---|---|
| 26 | 0 | 1 | 1 | 0 | 0 | 1 | Not allowed – can't have same wireless/wireline indication. |
| 27 | 0 | 1 | 1 | 0 | 1 | 0 | Consistent Combination of Indicators. |
| 28 | 0 | 1 | 1 | 0 | 1 | 1 | Inconsistent. |
| 29 | 0 | 1 | 1 | 1 | 0 | 0 | Consistent Combination of Indicators |
| 30 | 0 | 1 | 1 | 1 | 0 | 1 | Inconsistent – wireless number has consent |
| 31 | 0 | 1 | 1 | 1 | 1 | 0 | Not allowed – can't have same wireless/wireline indication. |
| 32 | 0 | 1 | 1 | 1 | 1 | 1 | Not allowed – can't have same wireless/wireline indication. |
| 33 | 1 | 0 | 0 | 0 | 0 | 0 | Not allowed – can't have same wireless/wireline indication. |
| 34 | 1 | 0 | 0 | 0 | 0 | 1 | Not allowed – can't have same wireless/wireline indication. |
| 35 | 1 | 0 | 0 | 0 | 1 | 0 | Wireline numbers are not subject to TCPA, but this number is an unconfirmed skip-trace number. |
| 36 | 1 | 0 | 0 | 0 | 1 | 1 | Possible, but not typical. |
| 37 | 1 | 0 | 0 | 1 | 0 | 0 | Inconsistent – wireless number has no consent. |
| 38 | 1 | 0 | 0 | 1 | 0 | 1 | Consistent – wireless number without consent is subject to TCPA. |
| 39 | 1 | 0 | 0 | 1 | 1 | 0 | Not allowed – can't have same wireless/wireline indication. |

FIG. 16C

| Row | Skip Trace Number | Confirmed As Correct | Consent Provided | Wireless Number | Wireline Number | Subject To TCPA Autodialer Prohibitions | Comments |
|---|---|---|---|---|---|---|---|
| 40 | 1 | 0 | 0 | 1 | 1 | 1 | Not allowed – can't have same wireless/wireline indication. |
| 41 | 1 | 0 | 1 | 0 | 0 | 0 | Not allowed – can't have same wireless/wireline indication. |
| 42 | 1 | 0 | 1 | 0 | 0 | 1 | Not allowed – can't have same wireless/wireline indication. |
| 43 | 1 | 0 | 1 | 0 | 1 | 0 | Consistent combination. |
| 44 | 1 | 0 | 1 | 0 | 1 | 1 | Inconsistent, consent provided |
| 45 | 1 | 0 | 1 | 1 | 0 | 0 | Possible, but not typical, since consent usually correlates with confirmed. |
| 46 | 1 | 0 | 1 | 1 | 0 | 1 | Inconsistent - consent provided usually means not subject to TCPA. |
| 47 | 1 | 0 | 1 | 1 | 1 | 0 | Not allowed – can't have same wireless/wireline indication. |
| 48 | 1 | 0 | 1 | 1 | 1 | 1 | Not allowed – can't have same wireless/wireline indication. |
| 49 | 1 | 1 | 0 | 0 | 0 | 0 | Not allowed – can't have same wireless/wireline indication. |
| 50 | 1 | 1 | 0 | 0 | 0 | 1 | Not allowed – can't have same wireless/wireline indication. |
| 51 | 1 | 1 | 0 | 0 | 1 | 0 | Consistent combination. |
| 52 | 1 | 1 | 0 | 0 | 1 | 1 | Inconsistent combination. |
| 53 | 1 | 1 | 0 | 1 | 0 | 0 | Inconsistent – since wireless number without consent is subject to TCPA |

FIG. 16D

| Row | Skip Trace Number | Confirmed As Correct | Consent Provided | Wireless Number | Wireline Number | Subject To TCPA Autodialer Prohibitions | Comments |
|---|---|---|---|---|---|---|---|
| 54 | 1 | 1 | 0 | 1 | 0 | 1 | Consistent combination. |
| 55 | 1 | 1 | 0 | 1 | 1 | 0 | Not allowed – can't have same wireless/wireline indication. |
| 56 | 1 | 1 | 0 | 1 | 1 | 1 | Not allowed – can't have same wireless/wireline indication. |
| 57 | 1 | 1 | 1 | 0 | 0 | 0 | Not allowed – can't have same wireless/wireline indication. |
| 58 | 1 | 1 | 1 | 0 | 0 | 1 | Not allowed – can't have same wireless/wireline indication. |
| 59 | 1 | 1 | 1 | 0 | 1 | 0 | Consistent combination. |
| 60 | 1 | 1 | 1 | 0 | 1 | 1 | Inconsistent combination. |
| 61 | 1 | 1 | 1 | 1 | 0 | 0 | Consistent combination. |
| 62 | 1 | 1 | 1 | 1 | 0 | 1 | Inconsistent – consent obtained. |
| 63 | 1 | 1 | 1 | 1 | 1 | 0 | Not allowed – can't have same wireless/wireline indication. |
| 64 | 1 | 1 | 1 | 1 | 1 | 1 | Not allowed – can't have same wireless/wireline indication. |

FIG. 16E

DIALING A TELEPHONE NUMBER SUBJECT TO AN AUTODIALER PROHIBITION IN A CONTACT CENTER

CROSS REFERENCE TO RELATED APPLICATIONS

This application is a continuation of U.S. patent application Ser. No. 15,344,645, filed on Nov. 7, 2016, which in turn is a continuation of U.S. patent application Ser. No. 14/682,337, filed on Apr. 9, 2015, which in turn is a continuation of U.S. patent application Ser. No. 14/535,620 filed on Nov. 7, 2014, now U.S. Pat. No. 0,036,811, which in turn is a continuation-in-part of U.S. patent application Ser. No. 14/494,171, now U.S. Pat. No. 9,037,119, filed on Sep. 23, 2014, which in turn is a continuation-in-part of U.S. patent application Ser. No. 13/958,011, filed on Aug. 2, 2013, now U.S. Pat. No. 8,989,814, which in turn is a continuation of U.S. patent application Ser. No. 13/902,130, filed on May 24, 2013, now U.S. Pat. No. 8,738,076, that claims priority to U.S. Provisional Patent Application 61/813,713, filed on Apr. 19, 2013, the contents of each of which are incorporated by reference for all that they teach.

FIELD OF INVENTION

This disclosure generally relates to concepts and technologies for originating a call by a contact center to a particular type of number while complying with regulatory requirements.

BACKGROUND

Contact centers originating calls must comply with the Telephone Consumer Protection Act ("TCPA", see 47 U.S.C. § 227) that regulates originating calls using certain types of equipment. Specifically, the TCPA prohibits using an automated telephone dialing system ("autodialer") under certain conditions (e.g., without prior express consent) to place a call to any telephone number assigned to a paging service, cellular telephone service, specialized mobile radio service, or other radio common carrier service, or any service for which the called party is charged for the call. Thus, if a particular telephone number is subject to the TCPA's prohibition of using an autodialer, a contact center should manually dial the number until express written consent is provided by the called party to receive calls at that number. Once consent has been provided, the contact center may then use an autodialer to dial the number. Telephone numbers that are commonly subject to the TCPA include wireless numbers and landline numbers tied to measured service in which the parties associated with these numbers are charged for usage, such as the number of minutes used in receiving and placing calls associated with these numbers.

With that said, in various circumstances, a contact center attempting to reach an individual may discover the individual is using a telephone number that has been assigned to a paging service, cellular telephone service, specialized mobile radio service, or other radio common carrier service, or any service for which the called party is charged for the call. In some instances, certain aspects of the telephone number may be known prior to dialing. For example, it may be known, or it may be readily ascertainable, that the number is assigned to a cellular telephone service. There are various service providers that provide this information upon request. However, other numbers may be associated with a service for which the called party is charged for the call that cannot be readily ascertainable. For example, a wireline (e.g., a.k.a. landline) telephone number may be associated with a billing plan where the subscribed is charged on a per-call basis in some manner. This is referred to herein as a "measured-service" rate plan. It may be difficult to ascertain prior to calling the number that the number is associated with such a rate (billing) plan. However, once this is known, or until this is known, the contact center may choose to follow certain procedures to ensure the number is not dialed using an autodialer.

Thus, a need in the industry exists for ensuring that compliance-related regulations and policies are adhered to by the contact center while also complying with the TCPA mandate that prohibits using an "autodialer" to call certain numbers without prior express consent. It is against this backdrop that the concepts and technologies disclosed herein are presented.

BRIEF SUMMARY

Technologies are generally presented herein pertaining to systems and methods for processing one or more dialing lists by a contact center containing numbers that may be subject to processing under certain regulatory requirements. In particular embodiments, the contact center manually dials telephone numbers, which may include numbers that are subject to the TCPA, until those numbers have been confirmed and/or consent has been obtained for calling those numbers to contact the parties reached, e.g., the intended parties. Once confirmation and/or consent have been obtained, those numbers may then be dialed using an automated dialing technique. Depending on the embodiment, the contact center may use a single dialing list or dual dialing list, wherein numbers subject to the TCPA's dialer prohibition are segregated from numbers that are not subject to the prohibition. Accordingly, in various embodiments, different contact center architectures may be used for processing the single or dual dialing lists.

The subject matter disclosed herein may be implemented as a computer-controlled apparatus, a computer process, a computing system, or as an article of manufacture such as a non-transitory computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIGS. 16A-16E represent a table of various indicator values associated with a number.

Figure 1:
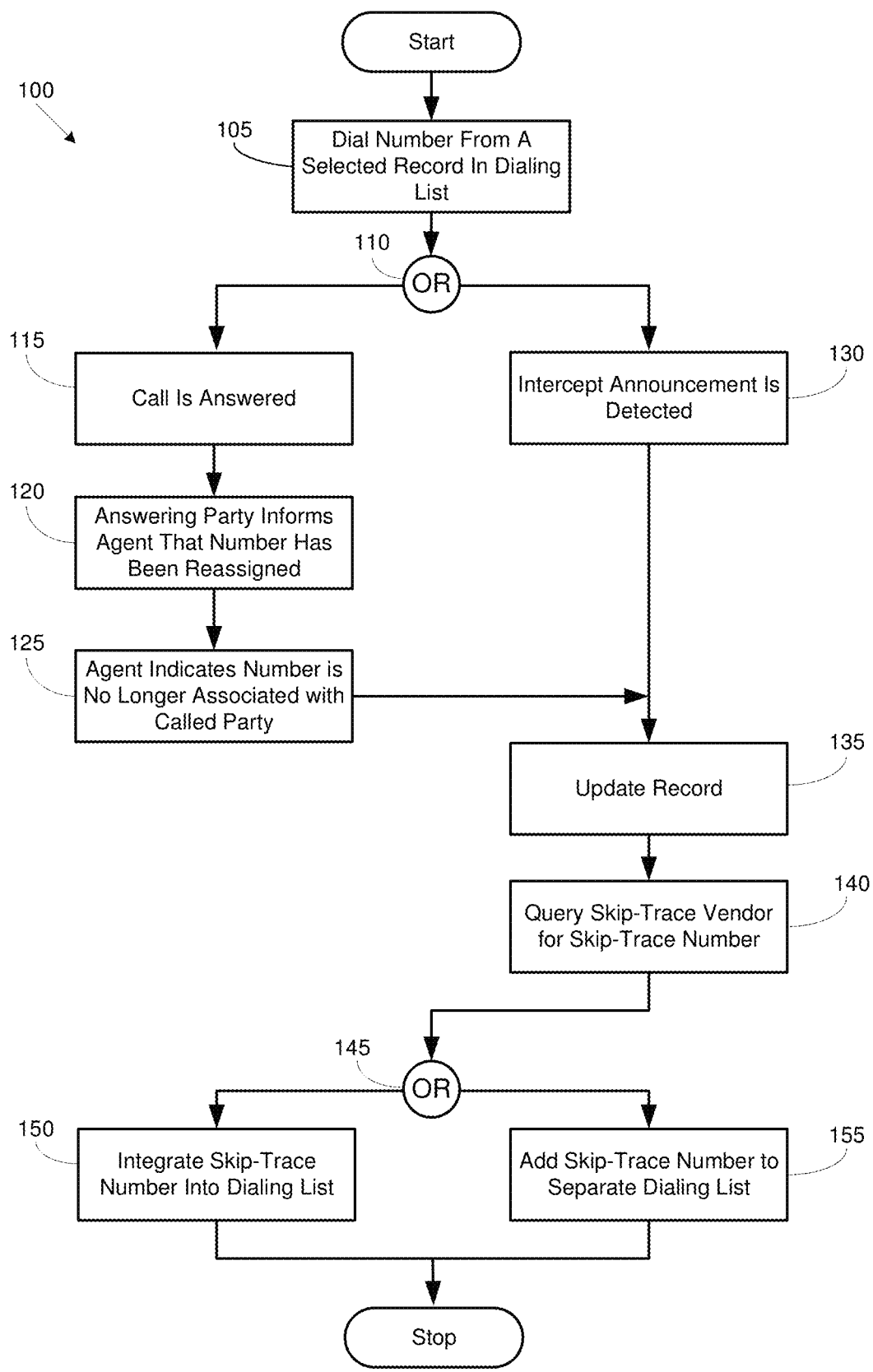
FIG. 1 shows one embodiment of a process flow used by a contact center for determining when to obtain a skip-trace number.

Finally, the drawings found in the aforementioned referenced patent applications are incorporated by reference.

DETAILED DESCRIPTION

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. As will be evident, there are a number of variations on the embodiments disclosed herein, but which are based on similar concepts and goals. Like numbers in the drawings refer to like elements throughout.

Glossary

The following terms are to be given the following meanings when used in the appropriate context. For example, the word "number" may be used in this specification to mean a telephone number, but in another context may have a different meaning, e.g., to refer to a specific amount, as opposed to meaning a "telephone number." Further, the terms defined herein are not necessarily applicable to the parent patent applications from which priority is claimed or which are incorporated by reference. Examples included in a definition are not intended to be exclusive, but illustrative.

ADS—(automatic dialing system) a computer-based processing system used in a contact center for originating automatically dialed calls.

Autodialer—a specific type of ADS that comports with the definition of the same as defined in the TCPA.

Agent—an employee in a contact center employed to handle communications. An agent typically will handle voice communications, but may handle other forms of communication as well.

Automatically Dialed—a call originated without direct human intervention as opposed to being manually dialed. Typically, an ADS may be used to originate automatically dialed calls.

Calling Record—a record in a dialing list. See "record."

Calling Window—a period of time during which calls may be made to an individual. In some instances, regulations may define the earliest and latest times for certain types of calls to an individual. The time is determined by the individual's local time.

Contact Center—a business entity engaged in receiving and/or originating communications to individuals or other businesses, wherein the communications have a common purpose (e.g., customer service, debt collection, telemarketing, taking reservations, etc.).

Current Number—a telephone number that is presently associated with an individual.

Confirmed Number—a telephone number that has been confirmed in some aspect.

This would include, but is not limited to, a number that is determined to be associated with a particular individual.

Consent—authorization provided by an individual associated with a telephone number to receive calls on that telephone number.

Dialing List—a set of calling records used by an ADS when originating calls from a contact center.

Disposition Code—information associated with a call processed in a contact center describing an aspect, outcome, or characteristic of the call.

Dispositioning the Call—the act of an agent or a system providing a disposition code.

Indicator—data indicating the specified information. In the context of a database record, this may be a portion of, or the entire field, in the record conveying the specified information.

Manually Dialed—a call originated as a result of human intervention, which may encompass an agent indicating each digit of a telephone number on a communications device of some form.

Measured Service (a.k.a. "metered service" or a "measure service rate plan") A telecommunication service associated with a telephone number wherein the called party is charged for the call in some fashion (a.k.a. "rate plan"). This may include billing arrangements where the called party pays on a "per-call" or "per-minute" basis. This may also include capped arrangements, where the called party pays based on exceeding a number of minutes of use associated with an incoming call or exceeding a number of incoming calls.

Number—a telephone number, including those which conform to the E.164 numbering plan.

Obsolete Number/Relinquished Number—a number that was previously associated with an individual, wherein calls to that number would previously reach the individual, but wherein the number is no longer associated with that individual due to various reasons, including, for example, the number being disconnected for termination of service.

Predictively Dialed (also, predictive dialing)—a dialing technique used by an ADS in a contact center wherein multiple calls may be initiated with the expectation that one or more of the calls will be answered and connected to available agents.

Record—a collection of data in a database associated with a common aspect; in the context of a dialing list, a record may represent a collection of data for a particular individual or account.

Skip-trace Number—a number purported to be currently associated with a particular individual. In many instances, but not all, the individual may be a debtor who is not current with one or more debt payments. A skip-trace number implies an obsolete number for the particular individual is known.

Telephone Device—any one of the various forms of telephony devices to communicate via voice, including a conventional telephone, dial pad, headset, and a soft-phone. A telephone device may encompass a smart phone used by an individual, and may have capabilities for sending a text message.

Service Concepts

A typical application of skip-trace numbers can be found in the debt-collection industry. A debt collector may have a telephone number of a debtor, but that number may have been disconnected or reassigned making that number obsolete, e.g., no longer associated with the debtor. Thus, using that number to attempt to reach the debtor may result in the calling party hearing a disconnect announcement or reaching a different party, if that number has been reassigned. Specifically, an obsolete or relinquished number is no longer useful for reaching the intended party, which in this instance, is the debtor.

In some circumstances, the debt collector may enlist the services of a skip-trace vendor, who provides a purportedly current telephone number of the debtor. The debt collector may provide to the skip-trace vendor identifying information regarding the debtor such as, for instance, name, personal identifying information, current or previous known residence, prior known telephone number, etc. The skip-trace vendor may use this information to confirm a current telephone number for the debtor.

Accordingly, the skip-trace vendor either ascertains a current telephone number for the debtor and provides it to the debt collector or informs the debt collector that a current telephone number cannot be found. However, the skip-trace vendor may occasionally provide the debt collector with an incorrect number. For example, the skip-trace number may correspond to a different individual with the same name or the skip-trace number may have been associated with the debtor at one time, but has since been reassigned to someone else. Further, given the prevalence of mobile phones, it is frequently the case that a skip-trace number is a wireless number. For example, the debtor may be using a pre-paid cell phone that may have been allocated a new number when it is purchased and activated.

Once obtained, the debt collector may add the skip-trace number to a dialing list that is processed by an ADS using an automated dialing technique of some form, although the ADS may or may not be considered an "autodialer" as defined by the TCPA. That is to say that although the TCPA includes a definition of an "autodialer," this term has been variously interpreted by district and state courts, as well as by the Federal Communication Commission's regulations. As a result, these various interpretations of the term "autodialer" are somewhat inconsistent with each other and have led to confusion on whether a particular implementation of an ADS is considered an "autodialer" under the TCPA.

With that said, an ADS may also manage compliance with various commonly known requirements that contact centers must abide with, such as ensuring compliance with calling windows. Calling windows are the times during the day (based on the called party's local time) in which a contact center is allowed to, or attempts to, originate certain types of calls. For example, certain calls made be subject to federal regulations which limit the calls to occur between 8:00 a.m. and 9:00 p.m., local time of the called party. In addition, an ADS may also perform various management and other related functions to ensure the contact center is operating efficiently. For instance, the ADS typically handles a plurality of agents engaged in one or more outbound campaigns. An outbound campaign can be described as a common purpose for placing a plurality of outbound calls. For example, an outbound calling campaign may be conducted to solicit donations for a particular charitable organization. The ADS manages the campaign and maintain records of numbers dialed, the call outcome, etc. Finally, it may also be helpful to indicate what an ADS is not. A mobile device designed to accommodate a single user (e.g., a cell phone, smart phone, or cellular equipped tablet) is not an ADS.

In some instances, using an ADS to dial a skip-trace number may present a potential liability for the debt collector. For instance, if the skip-trace number is incorrect (e.g., it is not associated with the intended individual), then the party reached most likely did not provide prior express consent to be called using an ADS. Thus, in this instance, if the ADS is considered an "autodialer" under the TCPA and the skip-trace number is assigned to a service for which the recipient is charged for the call or the number is associated with measured service, then the debt collector may have violated the TCPA. In another instance, the skip-trace number may be associated with the intended party (the debtor), but the number may also be associated with a measured service rating plan (e.g., for which the recipient is charged for the call). If the recipient has not provided express consent to be called on this number, the debt collector may have again violated the TCPA.

It is not entirely clear from current regulations whether the debtor's prior consent to be called on a previous number carries forward to a new wireless number obtained by the debtor or applies to another wireless number used or assigned to the debtor. Other variations are possible. For example, a person may have two cellular phones in which one phone is associated with his work and other phone is personal. The person may provide consent to be called on one number (his personal phone), but not on the other number (his work phone), or the person may have provided limited consent, or consent for a limited time for calling one of the numbers.

Accordingly, to minimize potential liability, a debt collector may manually dial a skip-trace number, particularly if the number appears to be assigned to a measured service rate plan for which the recipient is charged for each call, until the debt collector has confirmed it is appropriate to use an ADS to dial the skip-trace number. Depending on the circumstances, such confirmation may involve confirming the skip-trace number is truly associated with the debtor, confirming whether the skip-trace number is associated with a measured service rate plan for which the debtor is charged for a call, and if so, confirming the debtor has provided consent to be called on the skip-trace number. Thus, in various embodiments, until such a confirmation has occurred, a skip-trace number should not be dialed using an ADS but should be manually dialed instead, such as described in the aforementioned U.S. patent applications. Similar treatment may be accorded to other numbers, such as landline numbers that potentially may be metered service numbers.

Similarly, a wireless number for which consent has not been obtained may be similarly treated. That is, the wireless number is manually dialed until it is confirmed, and/or consent has been obtained. At that point, the wireless number may be dialed using as ADS.

For purposes of clarity, the example used herein refers to a debt collector initiating a call to a debtor, and it is possible that the debt collector may contract with a contact center or other third party to originate the calls to collect the debt, or the debt collector may actually operate the contact center. Reference to a debt collector should therefore be understood to encompass either case as well as other variations. Consequently, the terms "debt collector" and "contact center" may be used interchangeably in certain contexts in the examples provided herein, but these terms are intended to be distinct when used in the claims.

A contact center typically dials a set of telephone numbers in a dialing list in order to attempt to contact debtors. This dialing list largely contains numbers that are presumed to be current and not obsolete. However, it is possible that at any given time any one of the numbers may be discovered to be obsolete upon dialing it and necessitates obtaining a skip-trace number from a skip-trace vendor to be used in place of the obsolete number. Frequently, the debt collector may retain the old number since it may have value in identifying a current, valid number of the debtor and the skip-trace vendor may use the old number along with other information to ascertain a current number for the debtor.

Two different ways are disclosed herein in which the contact center can proceed upon encountering an obsolete number, and a number of variations thereupon may be employed, as will be seen. These variations involve using a single dialing list or dual dialing lists (the latter may also be referred to as "multiple dialing lists"). The different ways in which these dialing lists can be processed correlate to various embodiments and architectures as to how the contact center may minimize potential liability under the TCPA. A goal for the contact center may be to avoid using an autodialer to dial a "suspect" skip-trace number until the skip-trace number has been confirmed as appropriate to use with the autodialer. As mentioned, such confirmation may involve confirming that the number is associated with the targeted individual, confirming whether the number is associated with a service for which the targeted individual is charged for a call, and if so, confirming that the targeted individual's consent is obtained. Thus, in various embodiments, an "unconfirmed" skip-trace number may refer to a suspect skip-trace number that has not been confirmed. While in various embodiments, a "confirmed" skip-trace number is one that has been at least confirmed as being associated with the debtor. While in certain embodiments, a "confirmed" skip-trace number may refer to a number for which consent exists to use an ADS to dial it.

Determining the Need to Obtain a Skip-Trace Number

A contact center operator may initially use a dialing list in which all the numbers are presumably current, associated with debtors, and for which consent has been previously obtained if needed. At some point during the use of the dialing list, a number assumed to be valid is, instead, found to actually be obsolete. Upon discovering the number is obsolete, the contact center operator may obtain a skip-trace number to replace the obsolete number. Depending on the embodiment, the skip-trace number can be obtained in real-time or in a batch mode from a skip-trace vendor, and maintained in some distinct manner until it is confirmed, thereby allowing the skip-trace number to be used by the ADS.

In various embodiments, the skip-trace number is added back into the original dialing list, and is differentiated in some manner from other numbers in the list, or the skip-trace number is added into a separate list that is differentiated and used for manual dialing. Consequently, at a high level, the contact center may maintain a single integrated dialing list or separate (dual or multiple) dialing lists depending on the embodiment. Accordingly, in particular embodiments, a single list may contain both confirmed and unconfirmed skip-trace numbers, referred to as an "integrated" dialing list, even in instances when the dialing list does not necessarily contain any unconfirmed skip-trace numbers, but the record structure of the list is designed to do so.

Turning to FIG. 1, the process 100 illustrates a contact center initially using a (single) dialing list of numbers for which obsolete numbers are detected. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Looking now at FIG. 1, at a point in time when the process 100 begins, the initial list of numbers is presumed to only include current (non-obsolete) numbers. This could be viewed as a list of numbers for which the numbers are not subject to the TCPA dialer prohibition. Thus, in operation 105, a record from the dialing list is selected and a number in the record is dialed by a dialer, which may be considered an ADS, to initiate a call to the debtor associated with the record. Depending on the embodiment, the record may actually contain several numbers associated with the debtor (e.g., home number, work number, mobile number, etc.), but for purposes of illustration, a single number is selected for originating a call to the debtor. In addition, the record format may also include numerous fields storing information about the debtor, various contact-related information, prior contact details, etc.

At this point in operation 110, at least two different possibilities exist with respect to the originated call. One such possibility is the call is answered in operation 115. Assuming for sake of illustration that a live person answers the call, the answering party converses with an agent connected to the call in operation 120. Assuming the dialed number is obsolete, the answering party informs the agent that the number has been reassigned, e.g., that the number is no longer associated with the intended party (the debtor). This is usually established quickly when the agent attempts to speak with the intended party (e.g., "Is Mr. Smith there?"). In response, the agent, who may be using a workstation as described in the aforementioned patent/patent applications, indicates a disposition code or some other form of information in operation 125 that informs the ADS that the number is no longer current and is obsolete (e.g., the number is no longer associated with the intended party).

Alternatively, returning back to the junction point 110 indicating an option in the processing flow, the other possibility is the call may reach an intercept announcement in operation 130. This announcement may be provided by the telecommunications service provider routing the call to indicate that the number dialed is no longer in service, has been disconnected, or has been changed. Such announcements are frequently preceded by a defined set of three tones (call specialized intercept tones) so that the calling equipment can automatically detect the appropriate condition. For instance, in particular embodiments, the calling equipment may utilize digital signal processors to detect the presence of such tones. Different tones and announcements may be used to represent different conditions, which may all correlate to the number being obsolete. In this case, upon detecting an appropriate intercept announcement, the ADS determines the number is no longer associated with the called party and therefore is obsolete.

As a result of either the agent reporting or the ADS detecting the number is obsolete, the record in the dialing list is updated by the ADS in operation 135. This may be accomplished, for example, by updating a field in the record indicating the number is no longer current. Again, the exact format and number of fields used in the record to indicate this (and any other condition described herein) may vary from embodiment to embodiment.

The next operation illustrated in FIG. 1 involves the ADS querying a skip-trace vendor for a skip-trace number in operation 140. This may occur in real-time relative to detecting the number is obsolete. For example, an agent may invoke a function on his workstation that initiates the query to the skip-trace vendor. Typically, the query is launched prior to processing the next number in the dialing list. The ADS may use information associated with the record for the obsolete number in formulating the query to the skip-trace vendor.

The skip-trace vendor may return one or more numbers, and may further indicate additional information associated with the number(s). The additional information may indicate whether the number is known to be a landline (e.g., wireline), wireless, and/or VoIP number, whether the number is found in a do-not-call database, a date when the number was last known to be valid, etc. In addition, the skip-trace vendor may provide a confidence score associated with a number that is used to indicate the vendor's relative confidence in the number being correct. In other embodiments, information may be provided as to whether the number is associated with a measured service rate plan. If multiple numbers are returned, they may all be added to a manual dialing list or only the number with the higher (or highest) confidence score is added. Further, depending on the embodiment, the number may be added to a particular type of list (e.g., a predictive or manual dialing list) based on an indication of the type of number. For example, a skip-trace number indicated as wireline may be added to the predictive dialing list, whereas a skip-trace number indicated as wireless or VoIP may be added to the manual dialing list. If no indication is provided, the number may be treated as being "suspect" until the type of number is ascertained or confirmed. In addition, third party vendors as known to those skilled in the art can respond to a query indicating what type of a number a particular number is (e.g., wireline/wireless).

These third party vendors may be used in particular embodiments to confirm the type of number if desired.

In addition, the confidence score value for a skip-trace number may be used to ascertain how to process the number in various embodiments. For example, if the skip-trace number has a confidence score of 100% for being a current wireline-based number for a debtor, the skip-trace number may be treated as "confirmed." Thus, the number is not placed in the manual dialing list for confirmation, but presumed to be acceptable to include in a dialing list for autodialing (e.g., predictive dialing). On the other hand, in particular embodiments, the contact center may define a threshold so that any number with a confidence score below the threshold (e.g., 75% or less) is treated as suspect and an unconfirmed number. Such a number is included in a manual dialing list until it is confirmed okay to be autodialed. Thus, the threshold used to identify suspect numbers can vary according to the risk level desired by the contact center operator.

In other embodiments, the ADS may maintain a list of all obsolete numbers and submit a batch skip-trace query periodically to the skip-trace vendor. For example, a request for updated numbers may be submitted to the skip-trace vendor after the dialing list has been processed for the day. In these particular embodiments, related information of the debtor may also be conveyed along with the obsolete telephone number, to allow the skip-trace vendor to confirm the current number. Other variations are possible. In the latter case, the records warranting a skip-trace query may be cached until the processing of the dialing list is completed, until the completion of a shift, or some other time period.

The received skip-trace number(s) may be processed in one of several ways depending on the embodiment. Two such approaches are shown at junction point 145 in FIG. 1. In one approach, the skip-trace numbers are integrated into the original dialing list in operation 150. This approach may involve, for example, adding the skip trace number back into the appropriate record with one or more indicators reflecting that the record contains an unconfirmed skip-trace number. Embodiments using this approach may require the record structure to have the appropriate fields or indicators to reflect this. As will be seen, the record structure for the original dialing list can be modified in particular embodiments to create an integrated dialing list, or the record structure of the original dialing list can already have the required fields or indicators in particular embodiments to essentially be structured as an integrated dialing list.

The second approach show in FIG. 1 as operation 155 involves adding the skip-trace number to a separate skip-trace dialing list that is associated with the dialing list. In particular embodiments, this separate list only contains skip-trace numbers obtained from querying the skip-trace vendor and it may be presumed that each of the numbers in the separate skip-trace dialing list is unconfirmed.

The above flow of FIG. 1 represents a single pass through the dialing list. In various embodiments, the overall process may be repeated numerous times for a given list as each record is processed, though the looping process is not shown. In essence, each time the ADS dials a given number, it is possible for that number to be discovered as obsolete. Thus, being able to detect an obsolete number is required each time a record in a list is processed.

In summary, the above flow illustrates how a contact center may process a dialing list and ascertain the need to obtain skip-trace numbers. Further, depending on the embodiment, the contact center may maintain the skip-trace numbers in different ways such as integrating the results into a single list or adding the results into a separate list. Other variations on these procedures are possible. Regardless of the approach, an implicit or explicit indication that the skip-trace numbers obtained have not been confirmed is generally maintained, and thus, an autodialer should not be used to dial these numbers until they are confirmed. To recap, when a skip-trace number is incorporated into a single list, one or more fields in the record may be modified in various embodiments to distinguish this number from others in the list. If the original dialing list did not have these fields, then the dialing list is typically updated to add these fields. If the original dialing list already has the fields, then the same structure of the original dialing list may be used. When the skip-trace number is incorporated into a separate list, that separate list itself may distinguish the skip-trace number in various embodiments from those in the original list.

Single and Dual Dialing Lists

Figure 2:
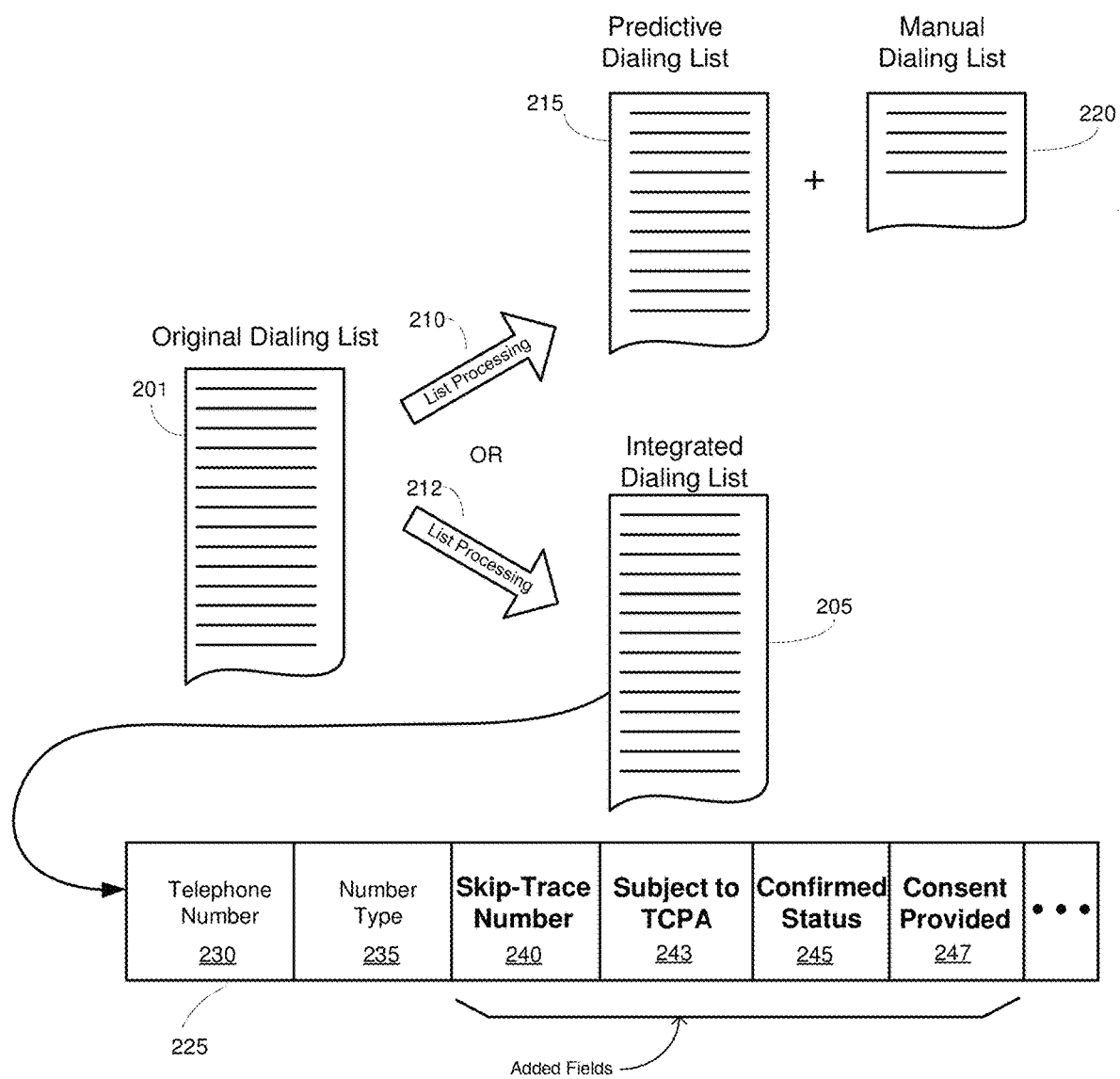
FIG. 2 illustrates at a high level the concept of segregating an integrated dialing list that includes skip-trace numbers and/or numbers subject to the TCPA dialer prohibition into two separate dialing lists.

Turning next to FIG. 2, the concepts of a using either a single integrated list or two separate lists are illustrated. Recall that in FIG. 1, the process flow illustrated a contact center starting with an initial dialing list and processing it. Upon discovering an obsolete number, the contact center may either 1) update the original list to form the integrated dialing list or 2) generate a separate manual dialing list in addition to the original dialing list.

These approaches are illustrated in FIG. 2 by first focusing on the original dialing list 201 initially processed by the contact center. Upon encountering an obsolete number, the contact center may proceed in one of two ways. The first approach, represented by processing arrow 210, results in producing two dialing lists, a predictive dialing list 215 and a manual dialing list 220. The predictive dialing list 215 contains records of numbers that are considered "safe" to dial using an autodialer and the manual dialing list 220 contains records of numbers that should be manually dialed.

In particular embodiments, the records that are obsolete are removed from the original dialing list 201 thereby transforming the original dialing list 201 into the predictive dialing list 215. While in other embodiments, the records that are obsolete are merely flagged as such in the original dialing list 215, thus resulting in an integrated dialing list 205. To flag the records that are obsolete in particular embodiments, the record structure of the original dialing list 201 may need to be modified (or the original dialing list 201 may begin with the required record structure, which means only setting particular value(s) for fields in the structure). The modification of the record structure is demonstrated with the second approach shown in FIG. 2 as indicated by processing arrow 212 and involves processing the original dialing list 201 thereby generating an integrated dialing list 205. In this case, the obsolete numbers are present in the list 205, but are distinguishable as such in the integrated dialing list 205.

In particular embodiments, a record structure 225 as shown in FIG. 2 may be used to distinguish newly added skip-trace numbers in the integrated dialing list 205. In this instance, the record structure 225 includes fields that indicate a telephone number 230 and a corresponding attribute, such as a number type 235 (e.g., wireline, wireless, or VoIP). Typically, a record stored in the integrated dialing list 205 may provide several telephone numbers for a debtor. However, in this instance, the record structure 225 is simplified for purposes of illustrating the inventive concepts as applied to a single number in the record. The various fields identifying characteristics of the number are collectively referred to as "number attribute fields."

Further, the structure 225 may include additional fields indicating whether the associated number for a record is a skip-trace number. For instance, the structure may include a "Skip-Trace Number" field 240 providing a flag or other form of indicator identifying the telephone number 230 as a skip-trace number. In addition, the record structure 225 may include a "Subject to TCPA" field 243 providing a flag or other form of indicator to identify whether the associated number is subject to the prohibition of being dialed by an TCPA autodialer (also sometimes referred to herein as "being subject to TCPA treatment" or similar such language). Depending on the embodiment, this particular field 243 may be used with respect to both skip-trace numbers and non-skip-trace numbers. Thus, this particular field may also be present in the data structure for the original dialing list 201.

The "Subject to TCPA" field 243 may indicate a binary condition where the number is known to be either subject to the TCPA or not. In other embodiments, the binary indicator may reflect that the number is subject the TCPA or its status is unknown. This reflects that in some instances, a number may be unknown as to whether it is subject to the TCPA until certain information is confirmed. While in other embodiments, the field may be able to convey several possible indicators, such as whether the number is: 1) subject to TCPA treatment; 2) not subject to TCPA treatment; and 3) unknown as to whether it is subject to TCPA treatment. For example, a wireline number typically is not subject to the TCPA and so it may default to an unknown indicator, and once confirmed, it may be then be set to indicate the number is not subject to TCPA treatment.

For instance, most wireline telephone numbers are not typically subject to the TCPA prohibition since most individuals have wireline service at a monthly fixed price and therefore are not charged for individual calls received on the service. However, that is not always the case. For example, an agent may contact a called party using a wireline telephone number and the party may inform the agent that the number is associated with measured service and therefore the called party is being charged for each call received at the wireline telephone number. As a result, the wireline telephone number in this instance is viewed as subject to the TCPA prohibition. Accordingly, the agent may then ensure the "Subject to TPCA" field 243 for the record is updated to reflect that the telephone number for the record is subject to being dialed in adherence to the TCPA so that the number is no longer called using an autodialer.

In other embodiments, additional or alternative fields may be used in lieu of the "Subject to TCPA" field 243. For example, a "Measured Service" field may be present in the profile record 225 and associated with a number. This could be used to indicate whether a wireline number is on a measured service rate plan for its subscriber, and therefore the number is subject to TCPA treatment similar to a wireless number. The "Subject to TCPA" field could also apply to a wireless number, since wireless plans may have some form of measured service for voice calls, even if it involves a flat rate for a cap on a set number of minutes of use with another rate for exceeding the cap. However, since all wireless numbers are already subject to TCPA treatment, the "Subject to TCPA" field 243 may have minimal utility in this embodiment. In such cases, the determinative factor as to how the number should be dialed may be whether consent has been obtained.

Furthermore, the record structure 225 may include a "Confirmed Status" field 245 that indicates whether a confirmation of the telephone number 230 has occurred. Typically, confirmation occurs when an agent converses with a called party and confirms that the number is correct, although other means may be used to confirm the number. In addition, confirmation may also involve confirming whether the number is associated with the corresponding number type shown for the record using the "Number Type" field 235 and/or whether the number is associated with a measured service rate plan for which the recipient is charged for a call. As noted earlier "confirmation" may mean one or more of several types of confirmation. Thus, in particular embodiments, the record structure 225 may include multiple, different "Confirmed Status" fields 245 to cover different types of confirmation. Therefore, it is a design choice as to whether a single field indicating a particular meaning of "confirmed" is used versus a number of various fields and/or indicators to indicate various combinations of confirmation. For instance, in particular embodiments, separate indicators may be used in the "Confirmed Status" field 245 for indicating whether the number is associated with the targeted party, whether the targeted party has been verbally or otherwise confirmed as the number type for the number, and/or whether the targeted party has verbally or otherwise confirmed the number is, or is not, subject to adherence to the TCPA.

Lastly, the record structure may include a "Consent Provided" field 247. This particular field 247 typically is used to indicate whether a called party has consented to being contacted using the associated telephone number and thus, the number may be called using an autodialer. Therefore, an agent may manually call a called party using a telephone number that typically is subject to being dialing in adherence to the TCPA (e.g., a wireless telephone number) and upon speaking with the called party, the party may indicate that it is okay for the contact center to contact the party using the telephone number. Thus, in this instance, the agent may ensure that the "Consent Provided" field 247 for the corresponding record for this telephone number reflects that the called party has provided consent to being called using the telephone number and thus, the telephone number may be called using an autodialer.

Further, in particular embodiments, the "Consent Provided" field may also indicate the type of consent, e.g., as to whether voice or text calls may be received as well as a duration and scope of the consent. Thus, restrictions may be indicated that are relevant to determining whether consent exists for a particular type, form, and/or instance of communication. For example, the consent may be provided for a text call as it related to a specific scope of information for a limited time. Or, the consent may be open-ended for receiving a voice call not limited as to the information content.

For example, in other embodiments an individual may interact with a server over the Internet using a computer with a web browser to provide their consent. This may entail the individual interacting with a web page to complete a form indicating their telephone number, name, express consent, duration (or time of expiration) of consent, and the scope or purpose. One common example could be an individual who provides consent to be notified of upcoming sales from a retailer, fraud alerts from a bank, shipping notifications from a parcel delivery service, school closings from a school, airline flights changes from an airline, etc. The server may then provide this information to the contact center, which updates the consent provided field 247 appropriately. As can be appreciated, there are various ways the individual may indicate and/or modify their consent, including those detailed in U.S. patent application Ser. No. 14/299,591, filed on Jun. 9, 2014, entitled "Managing Electronic Consent for Calling Campaigns", which is incorporated by reference. Furthermore, in some embodiments a separate database and/or records may be used to store the consent related information as detailed in the above identified patent application.

Thus, returning to FIG. 2, the ADS may process the predictive dialing list 215 under the first approach and update each list 215, 220 accordingly as obsolete numbers or numbers that are subject to TCPA treatment are found. In other embodiments, a combination of number attribute fields in the number profile record may be used as the basis for updating each list. Further, agents may process the manual dialing list 220 by manually placing calls to the numbers on the list 220 and further update each list 215, 220 accordingly as each called party consents to being called using the number. At the end of the processing of each list 215, 220, the two lists 215, 220 may be merged into one list or maintained separately depending on the embodiment.

Alternatively, the ADS may process the original dialing list 201 under the second approach and produce the integrated dialing list 205 as obsolete numbers are found. If no obsolete numbers are detected, then no skip-trace numbers are added. However, assuming that at least one obsolete number is detected, then a skip-trace number will be obtained and added back into the original dialing list 201 thereby producing the integrated dialing list 205. Thereafter, the contact center may simply work with the integrated dialing list 205.

Finally, as mentioned above, the record structure 225 for the integrated dialing list 205 in particular embodiments typically requires some type of modification relative to the record structure of the original dialing list 201, unless that record structure already accommodates these fields. With that said, adding fields to a record structure in a database is a well known process, so that the desired record structure 225 for the integrated dialing list 205 could be created prior to or during processing of the records found in the list 225. On the other hand, depending on the embodiment, the record structure for the predictive dialing list 215 may be the same as the original dialing list 201 and therefore may not require modification. Likewise, depending on the embodiment, the manual dialing list 220 may have the same or different structure. Thus, there are relative advantages to using the two different processing approaches which may or may not involve altering the basic record structure of the original dialing list 201 to add the fields required for indicating skip-trace numbers, numbers subject to the TCPA, and/or confirmation status indicator(s).

Although the record structure 225 illustrates various fields as positioned within the record, other embodiments may use pointers, linked lists, indices, or other well known mechanisms to identify the relevant fields and/or contents within. Thus, the relevant fields may be incorporated into other lists, arrays, tables, objects, or other forms of data structures associated with the record structure 225.

Different Field and/or Indicator Combinations

The profile record may comprise a number of different fields and/or indicators, as described above. The exact format may vary from embodiment to embodiment. Further, the format of a given embodiment may be designed to be backwards compatible with existing fields and/or indicators. For example, many records maintain information about whether a number is a wireline or wireless number. In this example, the record structure may be augmented to include a consent field so that a determination can be made whether the number should be manually dialed or whether it can be dialed using an autodialer. However, such a structure does not accommodate a measured service wireline number, which also may be subject to the TCPA prohibition of using an autodialer in certain conditions. One approach is to add an indicator and/or field for measured service. However, it may be preferred to simply include a "Subject to TCPA" field 243 to indicate how the number should be dialed. As will be seen, depending on how the fields and/or indicators are defined, and which ones are present in the record 225, there may be certain combinations of fields and/or indicators that are inconsistent.

For example, a "Number Type" field 235 may be present and may store a binary indicator—e.g., the indicator indicates either the number is a wireline or a wireless number. On the other hand, there may be two fields. One field may indicate the number is a known wireline number (or conversely, unknown) and the other field may indicate the number is a known wireless number (or conversely, unknown). Obviously, a number cannot be both a wireline and wireless number at the same time, so in this case, such a combination cannot exist and would be inconsistent. On the other hand, instead of two fields, a single field storing a binary indicator could be used, and it would inherently be one value or the other. However, in this case, a single binary field would not accommodate an "unknown" status of the number. Thus, using a single binary field presents an issue if a number is obtained, but it is not readily known as to what type it is. The procedures may assign a default value, but this may present an inaccurate reflection of the number until it can be confirmed.

FIGS. 16A-16E illustrates a table of 64 values showing combinations of six fields. These fields may be associated with a number and indicate various aspects, such as reflecting whether the number is a skip-trace number, confirmed as correct, whether consent has been provided, whether the number is a wireless number, whether the number is a wireline number, and whether the number is subject to the TCPA prohibition of using an autodialer.

Many of the combinations are "inconsistent" or "not allowed," e.g., they reflect a combination that may not be allowed depending on how the fields and indicators are defined. For example, it may be that any combination where the wireless number field and the wireless number field have the same indicator (value) is not allowed. This is because a number cannot be both wireline/wireless or neither wireline/wireless. Thus, the comments column for rows 1 and 2 reflect this potential inconsistency, as do a number of other comments for other rows. However, if the binary indicator indicates either a "known" type of number or an "unknown" type of number, then an unknown type of number could be classified as being both an unknown wireline number and an unknown wireless number.

Row 3 reflects that the number is a wireline number and not subject to the TCPA autodialer prohibition. This could reflect that the wireline number is conventionally billed (e.g., not billed on a measured service basis), so that the number is not subject to the TCPA. However, if that same number was billed on a measured service basis, which could be reflected in row 4. In this case, the number is subject to the TCPA autodialer prohibition. However, if consent has been provided by the individual for calling that number, then it would not be subject to the TCPA prohibition (see, e.g., row 11). Along these lines, a wireline number could be confirmed by the individual as being correct, but the individual may have informed the agent that the number is associated with measured service. Consequently, the contact center operator may characterize that number as shown in row 20. Specifically, that number is indicated as subject to the TCPA autodialer prohibition.

As mentioned, a number of combinations may not be consistent. For example, when consent has been provided to call a wireless number, then the "Subject to TCPA" indicator should typically be set to "0". Thus, row 26, for example, reflects this inconsistent combination. When consent is provided by the individual to call that number, then that number typically is not subject to the TCPA prohibition.

A contact center, however, may use certain default assumptions, in the absence of knowing the status of an indicator. For example, a contact center may choose to assume that a wireline number is subject to TCPA treatment, until explicitly informed or made aware of that it is not. Thus, row 36 reflects that a wireline number skip-trace number, which is unconfirmed, may be assumed to be a potentially measured service landline number and treated as subject to the TCPA until further information indicates otherwise. Other contact centers may presume it is not subject to the TCPA unless informed otherwise. This is because most wireline numbers are not billed on a measured service basis. Similarly, in the absence of consent, a wireless number may be presumed to be subject to the TCPA.

A contact center may choose to implement a single field to determine how to dial a number (regardless of number type), such as the "Subject to TCPA" field previously mentioned. The contact center could then set this as appropriate in lieu of maintaining other fields. For example, a contact center may ascertain that a number is wireless and that consent has been obtained, and then set the "Subject to TCPA" field appropriately. This would potentially allow the elimination of the separate "consent" and "type of number" fields and simplify the number of combinations. However, there may be reasons to maintain these other fields. For example, even though the "Subject to TCPA" field may govern whether or not to use manual dialing or an autodialer, having a separate "consent" field may maintain information about the scope of the consent, and expiration date of the consent, what type of calls can be made, etc. This may be useful in determining how to dial a number. For example, a process may automatically review the expiration date of consent and if expired, then reset the "Subject to TCPA" field to reflect that the call should be manually dialed.

Those skilled in the art will realized that the comments shown in FIGS. 16A-16E for a particular row depend on how the fields are defined and other assumptions as to whether a combination is consistent or not. Thus, it should be recognized that in other embodiments, the interpretation of the combination of fields may be different than shown.

Hybrid Approaches

Returning back to FIG. 2, other variations are possible, which meld portions of both the single and dual list approaches. For instance, in particular embodiments, a contact center may dial numbers in an original dialing list 201, discover obsolete numbers, and reflect this by altering the fields for the appropriate records in the original dialing list 201. Later, the contact center may obtain skip-trace numbers for the obsolete numbers and add these numbers into the original dialing list 201 thereby producing an integrated dialing list 205. However, before reattempting to dial the numbers on the integrated dialing list 205, the contact center may remove the skip-trace records from the integrated dialing list 205 to produce two separate lists, a predictive dialing list 215 and a manual dialing list 220. As a result, the predictive dialing list 215 only contains numbers that can be safely dialed by the ADS, whereas the manual dialing list 220 contains numbers that are dialed manually.

Figure 3:
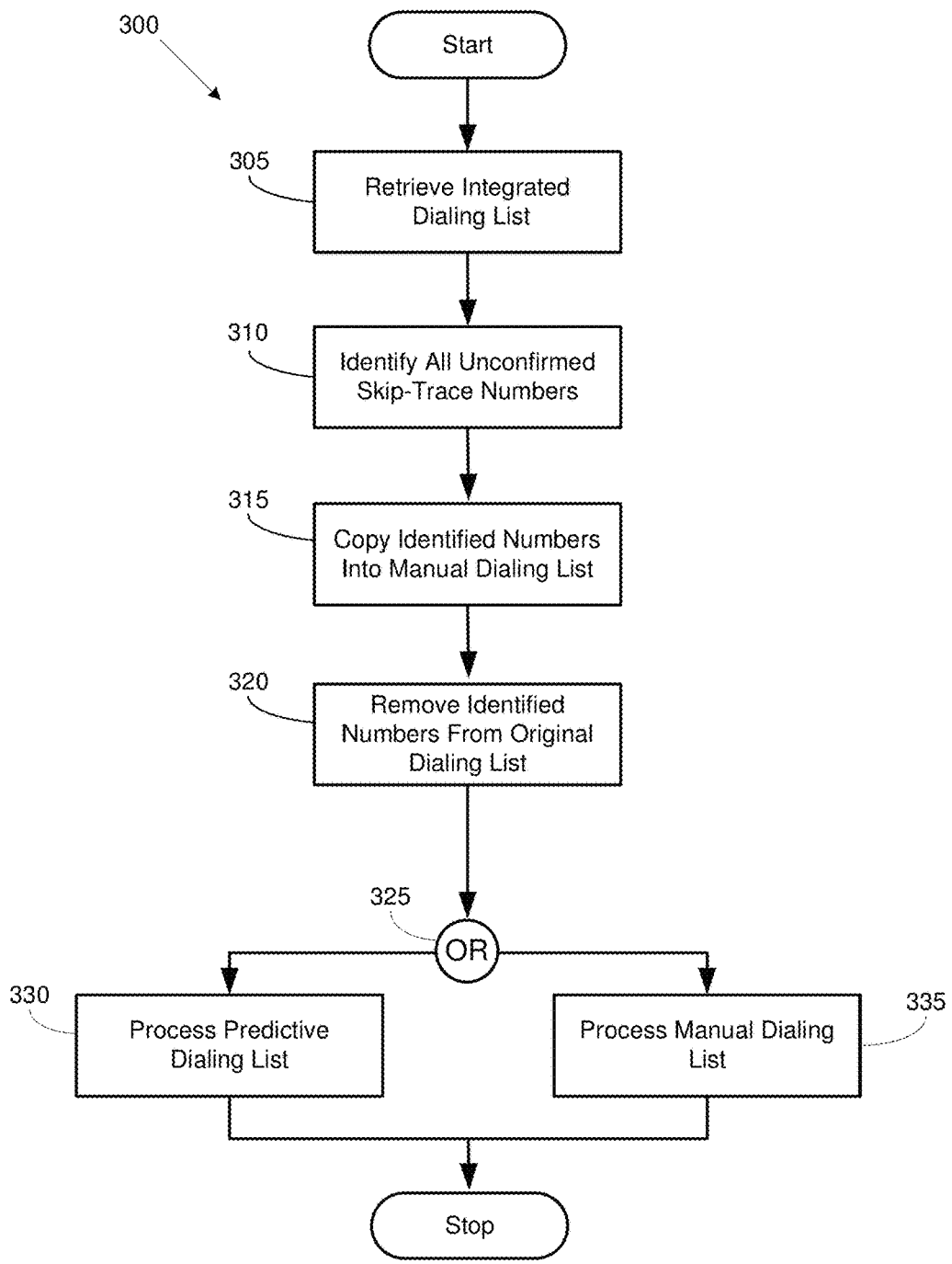
FIG. 3 illustrates one embodiment of a process flow for processing an integrated dialing list to produce the two separate dialing lists and then using the dialing lists.

This process 300 is shown in FIG. 3 and begins with retrieving the integrated dialing list 205 in operation 305. Next, all unconfirmed skip-trace numbers are identified in the list in operation 310. These numbers are copied into a separate manual dialing list 220 in operation 315 and are then removed or flagged to be skipped during processing of the integrated dialing list 205 in operation 320. Then, at junction 325 the ADS may opt to process the predictive dialing list 215 (that is, the portion of the integrated dialing list 205 that can be safely dialed by the ADS with the unconfirmed skip-trace numbers removed or flagged) in operation 330 and/or the manual dialing list 220 in operation 335. Depending on the embodiment, these two dialing lists could be processed serially or in parallel.

Those skilled in the art are likely able to devise variations on the process flow shown in FIG. 3 in light of this disclosure. For instance, some contact centers may pre-process a dialing list before loading each respective dialing list into processing components, whereas other contact centers may use an ADS that integrates this processing as part of the dialing process. At a high level, the embodiment of the process flow shown in FIG. 3 indicates that all unconfirmed skip-trace numbers are identified, copied, and removed. While in other embodiments, this may occur in a looping manner by processing each number on a record-by-record basis. Further, it is not always necessary to actually remove the unconfirmed skip-trace numbers from the dialing list. Instead, a flag could be set that effectively removes a record for an unconfirmed skip-trace number from processing by the ADS in that the flag indicates to the ADS to skip the record.

Other variations are possible while adhering to the principles and concepts disclosed herein. For example, the process flow shown in FIG. 3 could also be applied to those numbers flagged as "Subject to TCPA" treatment. Specifically, those numbers where the flag is set in "Subject to TCPA" field 243 could be identified in operation 310 and copied into the manual dialing list in operation 315. Just as unconfirmed skip-trace numbers are segregated out for manual dialing, so are the numbers subject to TCPA treatment. This process could also cover either wireline or wireless numbers, which are subject to TCPA treatment.

Figure 4:
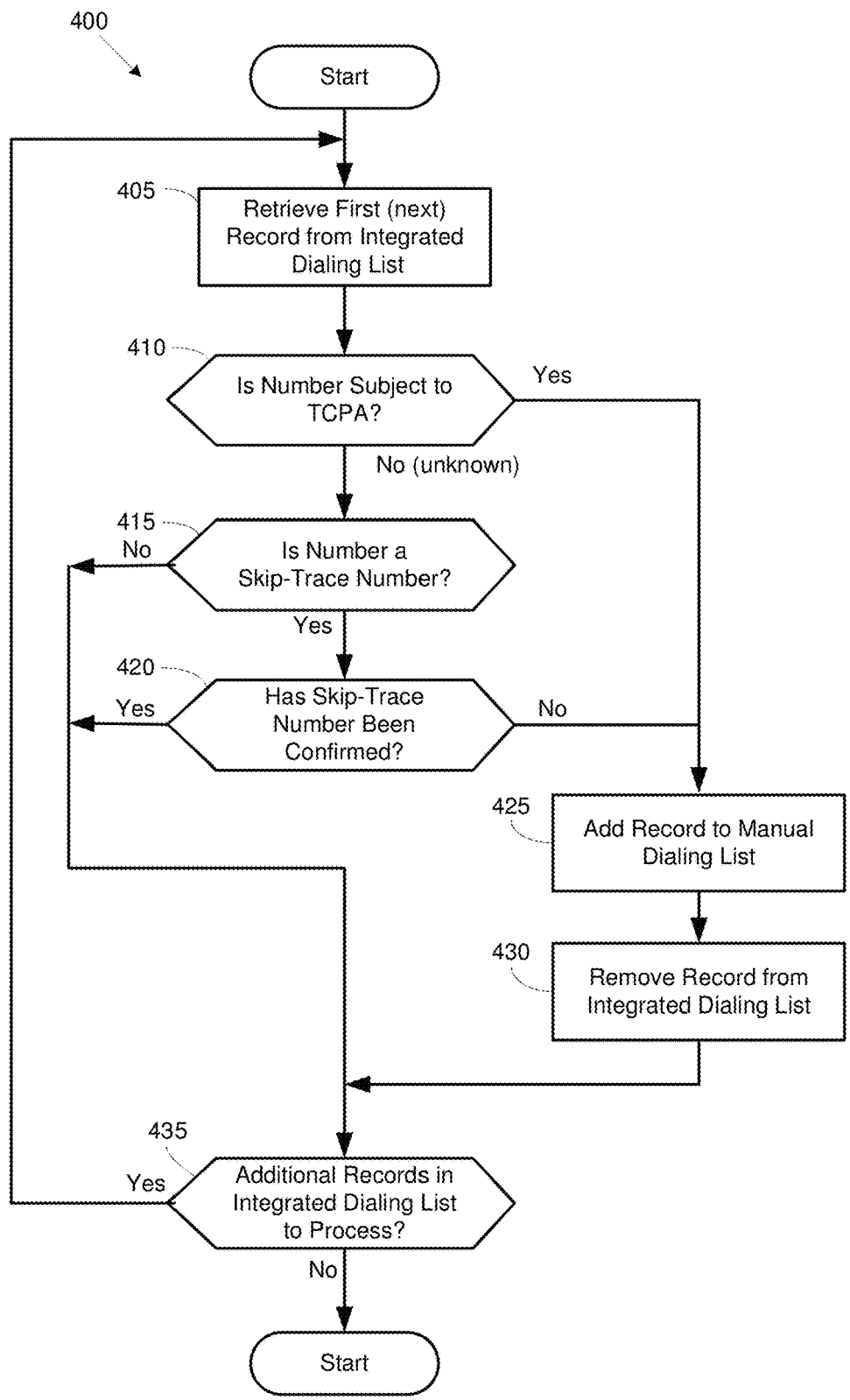
FIG. 4 illustrates one embodiment of a process flow for processing an integrated dialing list comprising a field indicating whether the number is subject to the TCPA dialer prohibition.

A variation of the process flow of FIG. 3 is shown in FIG. 4. Specifically FIG. 4 illustrates processing records from an integrated dialing list 205 and the process 400 begins with retrieving an initial or next record from the integrated dialing list 205 in operation 405. Depending on the embodiment, the record may include one or more fields that are examined and the order in which the fields are examined may vary. With respect to the embodiment shown in FIG. 4, the first field examined indicates whether the number is a number with the "Subject to the TCPA" field set in operation 410. If the answer is "yes," then the number should be added to the manual dialing list in operation 425. If the answer is "no," then the number may potentially be retained in the integrated dialing list, depending on the subsequent test results. In this embodiment the "no" branch may represent the number is unknown as to whether the number is immediately subject to TCPA treatment Assuming that from operation 410 the number is not known to be subject to the TCPA, a determination is made as to whether the number is a skip-trace number in operation 415. In particular instances, this determination may be made based on a second field examined in the record. If the answer is "no," then the number can be retained in the integrated dialing list 205 and the process proceeds to operation 435 to determine if there are additional records in the integrated dialing list. (It is presumed that such numbers have consent and thus being dialed by the ADS conforms to the TCPA. Therefore these numbers may be retained in the integrated dialing list 205.)

However, if the number is a skip-trace number in operation 415, then a determination is made as to whether the skip-trace number has been confirmed in operation 420. Again, this determination may be made based on a field examined in the record. If the number has been confirmed, then the record may be retained in the integrated dialing list 205. However, if the number has not been confirmed, then the record is added to a manual dialing list 220 in operation 425 and removed from the integrated dialing list 205 in operation 430. The process continues to operation 435 where a determination is made as to whether there are additional records in the integrated dialing list 205 to process. Once the all the records in the integrated dialing list 205 have been processed, the integrated dialing list 205 is transformed into a predictive dialing list 215 and a manual dialing list 220 is created.

At this point, the predictive dialing list 215 may be processed by an ADS such as a predictive dialer. Further, any numbers remaining in the list 215 are presumed to have consent to be called using the ADS. That is say, if consent were not present, then these numbers should have been moved over to the manual dialing list 220.

Accordingly, the ADS processes the predictive dialing list 215 and dials the various numbers in the list 215. However, it can be appreciated that at any given time an individual associated with a number in the predictive dialing list 215 may have relinquished his or her telephone number. Thus, in particular embodiments, each time the ADS processes the predictive dialing list 215, the ADS may encounter a number that is no longer associated with the intended called party and updates the list 215 accordingly. A number no longer associated with the intended party could be indicated as "Subject to TCPA" and moved over to the manual dialing list, which would reflect that the number should be manually dialed, but it may also be useful to reflect that the number is obsolete. (Similarly, in particular embodiments, the components used in manually dialing the numbers in the manual dialing list 220 are also configured to update the manual dialing list 220 when an obsolete number is encountered). Therefore, when the ADS encounters an obsolete number and updates the predictive dialing list 215, the predictive dialer list 215 essentially becomes an integrated dialing list 205. In other words, each time the ADS processes the predictive dialing list 215 to originate calls, unconfirmed skip-trace numbers may be added to the list 215 resulting in the predictive dialing list 215 being converted back into an integrated dialing list 205.

In summary, depending on the embodiment, there may be a variety of record structures and corresponding dialing lists that can be used by a contact center that involve skip-trace numbers and/or numbers subject to TCPA treatment. However, regardless of the specific record structure and number of lists used, the ADS is typically able to process a detected obsolete number, and/or a number subject to TCPA treatment, and process such numbers appropriately (e.g., have them manually dialed) as opposed to using an ADS. Once the skip-trace number has been confirmed or a number is indicated as not being subject to the TCPA, then the number be dialed using the ADS.

Dual List Dialing Architecture

Whether a single dialing list or dual dialing lists scheme is used may impact (or depend on) the contact center architecture used to process the dialing list(s). For instance, in various embodiments, an architecture for handling dual dialing lists may incorporate two sets of components: one subset of components for processing the predictive dialing list 215 (referred to as a "predictive dialing sub-system," which is a type of ADS) and another subset of components for processing the manual dialing list 220 (referred to as a "manual dialing compliance sub-system," which is not a type of ADS). An embodiment of such an architecture is shown in FIG. 5.

Figure 5:
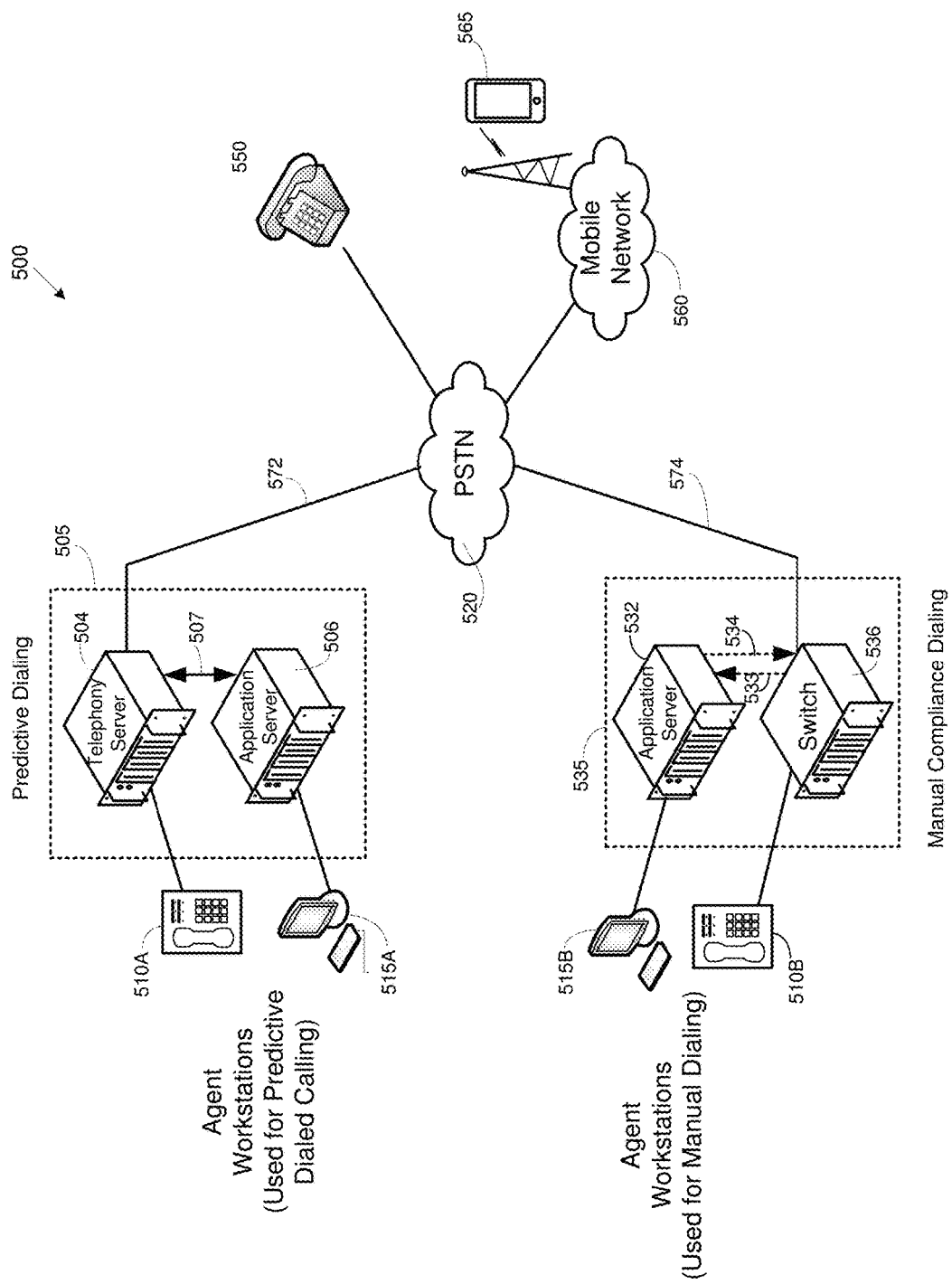
FIG. 5 illustrates one embodiment of an architecture in a contact center for processing two dialing lists, namely a first sub-system for dialing a first dialing list comprising confirmed skip-trace numbers and a second sub-system for manual dialing of a second dialing list comprising unconfirmed skip-trace numbers.

In FIG. 5, a contact center architecture 500 may include an ADS comprising components used for predictive dialing such as agent workstations comprising telephones and agent computers and a predictive dialing sub-system 505. In particular embodiments, the predictive dialing sub-system 505 may comprise a telephony server 504 operating in communication 507 with an application server 506. In these particular embodiments, the application server 506 may process a predictive dialing list 215 while performing well-known predictive dialing functions, and may instruct the telephony server 504 to place calls as appropriate. Upon one of the calls being answered, the call is connected to an agent's telephone 510A and the application server 506 executing a list processing module may present account information to the agent's computer 515A.

Accordingly, in particular embodiments, calls are established over facilities 572 to a PSTN 520 that may connect to various types of telephones such as, for example, wireline telephones 550. In addition, calls may also be established to one or more mobile network operators 560 that routes the calls to mobile devices 565. In instances when a call is originated using the predictive dialer sub-system 505 to a telephone number, that number is typically not subject to the TCPA prohibition of using an ADS, it is assumed the contact center has express consent from the party associated with the number to place the call, if so required. Thus, the "Consent Provided" field 247 would typically indicate that consent had been provided.

Although calls are placed using conventional PSTN type facilities in FIG. 5, one of ordinary skill in the art should understand that in various embodiments other types of facilities may be used in addition to or in place of PSTN type facilities such as, for example, IP-based type facilities using a SIP server. Other variations are possible as known to those in the art.

In addition, the contact center architecture 500 may also employ a manual dialing compliance sub-system 535 that processes the manual dialing list 220 for unconfirmed skip-trace numbers or for numbers which are indicated as "Subject to TCPA" treatment. Furthermore, the manual compliance dialing sub-system 535 may be used for dialing other numbers, e.g., for which consent has not obtained. In particular embodiments, the manual compliance dialing system 535 may comprise an application server 532 executing a list processing module that is in communication with a switch 536. The application server 532 may be connected to agent computers and the switch 536 may be connected to agent telephones. In certain embodiments, the switch 536 may be a PBX or similar type of switching device, although it is not necessary that all the functionality of a conventional PBX be present in switch 536. Thus, in some embodiments, a PBX may be present in lieu of switch 536. In particular instances, the functionality of the switch 536 may include capabilities necessary to perform the steps described below that illustrate one embodiment of how manual dialing may occur. Specifically, the switch 536 in this embodiment sends a message to the application server 532 indicating a call an agent has dialed, and potentially receives and acts upon a response or command 534 from the application server 532.

Thus, the application server 532 accesses the manual dialing list 220 stored in memory (which may have been retrieved from a database) and displays a number to an agent on the agent's computer 515B. In particular instances, the number displayed to the agent is an unconfirmed skip-trace number and/or a number that is subject to TCPA processing. The agent views the number on his computer screen and uses his telephone 510B to dial the displayed number. Accordingly, the switch 536 processes a call request associated with the dialed number and initiates a message 533 to the application server 532 and may indicate which agent (e.g., originating station telephone number) has originated the request and the number the agent has dialed (e.g., the called party number). In response, the application server 532 compares the number dialed by the agent to the number it had just presented to the agent's computer 515B. In this way, the application server 532 can determine whether the agent actually dialed the number just presented to the agent. Accordingly, the application server 532 may then authorize or confirm the request to the switch 536 via a response message 534 and the switch 536 may initiate the call over facilities 574 to the PSTN. In this manner, the switch 536 establishes a call to an unconfirmed skip-trace number or a number which is indicated as subject to TCPA processing.

Thus for the embodiment shown in FIG. 5, the application server 532 in the manual compliance dialing subsystem 535 is not used to establish the call, although it is informed of the presence of the call from the switch 536. Depending on the embodiment, the application server 532 may merely acknowledge receipt of the information from the switch 536 or may authorize the switch 536 to proceed with the call. Therefore, the application server 532 may track numbers dialed by an agent and/or may block numbers dialed (which may have been misdialed) by the agent. In this manner, the manual compliance dialing sub-system 535 may allow a call to be established from a manual dialing list 220 without using what is considered to be an autodialer and may ensure that various compliance requirements are adhered to. Additional details of the operation and options associated with the manual compliance dialing system 535 are described in the aforementioned patent/patent applications.

Further, in particular embodiments, the application server 506 in the predictive dialing sub-system 505 may share common functionality with the application server 532 in the manual compliance dialing sub-system 535. More specifically, the list processing module in each of these application servers may have common capabilities. For instance, both application servers 506, 532 may provide functionality for managing agents, recording calls, measuring agent performance and call parameters, and performing other functions commonly found in a contact center. Furthermore, both application servers 506, 532 may perform call compliance functions. This includes, for example, ensuring that calls in the dialing list are originated within the allowable calling windows with respect to the called party. Other functions may involve handling of various conditions, such as busy, no answer, or an answering machine. While other functions may involve coordinating with speech recognition systems, recording systems, scheduling systems, etc. However, the application server 506 used in the predictive dialing sub-system 505 performs the various predictive dialing functions (or providing other automatic dialing techniques), whereas the application server 532 in the manual compliance dialing sub-system 535 does not. On the other hand, the application server 532 in the manual compliance dialing sub-system 535 interfaces with the switch 536 in a manner that is different from the application server 506 in the predictive dialing sub-system 505 interfacing with the telephony server 504. However, because there is an overlap in functionality, the term "application server" is used in both instances, although it should be recognized that the functionality of their respective list processing modules, some of which is common between the two servers 506, 532, is not typically entirely the same. Thus, some functionality may be applicable to one sub-system but not the other.

At a high level, FIG. 5 illustrates how the two separate lists can be employed by a contact center in particular embodiments. That is to say for the contact center architecture 500 shown in FIG. 5, the predictive dialing list 215 is employed by the predictive dialing sub-system 505 and the manual dialing list 220 is employed by the manual compliance dialing sub-system 535. Thus, depending on the embodiment, each dialing sub-system 505, 535 may operate independently and simultaneously of each other. As the predictive dialing sub-system 505 processes the predictive dialing list 215, the system 505 may encounter relinquished numbers. As discussed above, these relinquished numbers can be reflected back into the predictive dialing list 215 or into a separate manual dialing list 220 as appropriate. Accordingly, the predictive dialing sub-system 505 (or other component) can submit subsequent or real-time queries to a skip-trace vendor who may return purportedly current skip-trace numbers that can be added in real-time or at periodic intervals to the manual dialing list 220 for dialing by the manual compliance dialing sub-system 535. For instance, in particular embodiments, the dialing lists are updated daily so that new skip-trace numbers identified by the predictive dialing sub-system 505 during the day's processing can be added to the manual dialing list 220 for manual dialing the next day.

When the manual compliance dialing sub-system 535 processes the manual dialing list 220, it can be expected that calls for some numbers will be answered by the intended parties who will confirm with agents that the dialed numbers are associated with them. In addition, these answering parties may also provide consent to the contact center using that number. Further, it can be expected that for some numbers in the manual dialing list 220 calls will not be answered by the intended party, numbers will be identified as obsolete, and/or intended parties will not provide consent. However, once a manually dialed number is "confirmed" as acceptable to be processed by the predictive dialing sub-system 505, the number can be added back into the predictive dialing list 215 with the appropriate record indicator fields updated.

For instance, if an embodiment includes a "Confirmed Status" and "Subject to TCPA" fields, then these should be set in a consistent manner depending on how the fields are defined. For example, if it is confirmed that a number is associated with the correct individual, confirmed that consent exists, and/or that the number is not subject to measured service, then both the "confirmed" and "Subject to TCPA" fields should be set in a consistent manner. In some embodiments, a number may be confirmed as associated with the correct individual, but no explicit confirmation of whether the number is associated with measured service exists. Thus, the "Subject to TCPA" field may be set to "unknown" even though the confirmed field indicates the other information is "confirmed." On the other hand, a number may be "confirmed" as to being associated with the correct individual and that there is consent to call the individual. In this instance, the "Subject to TCPA" field should be set to "no" since an ADS can be used.

Figure 6:
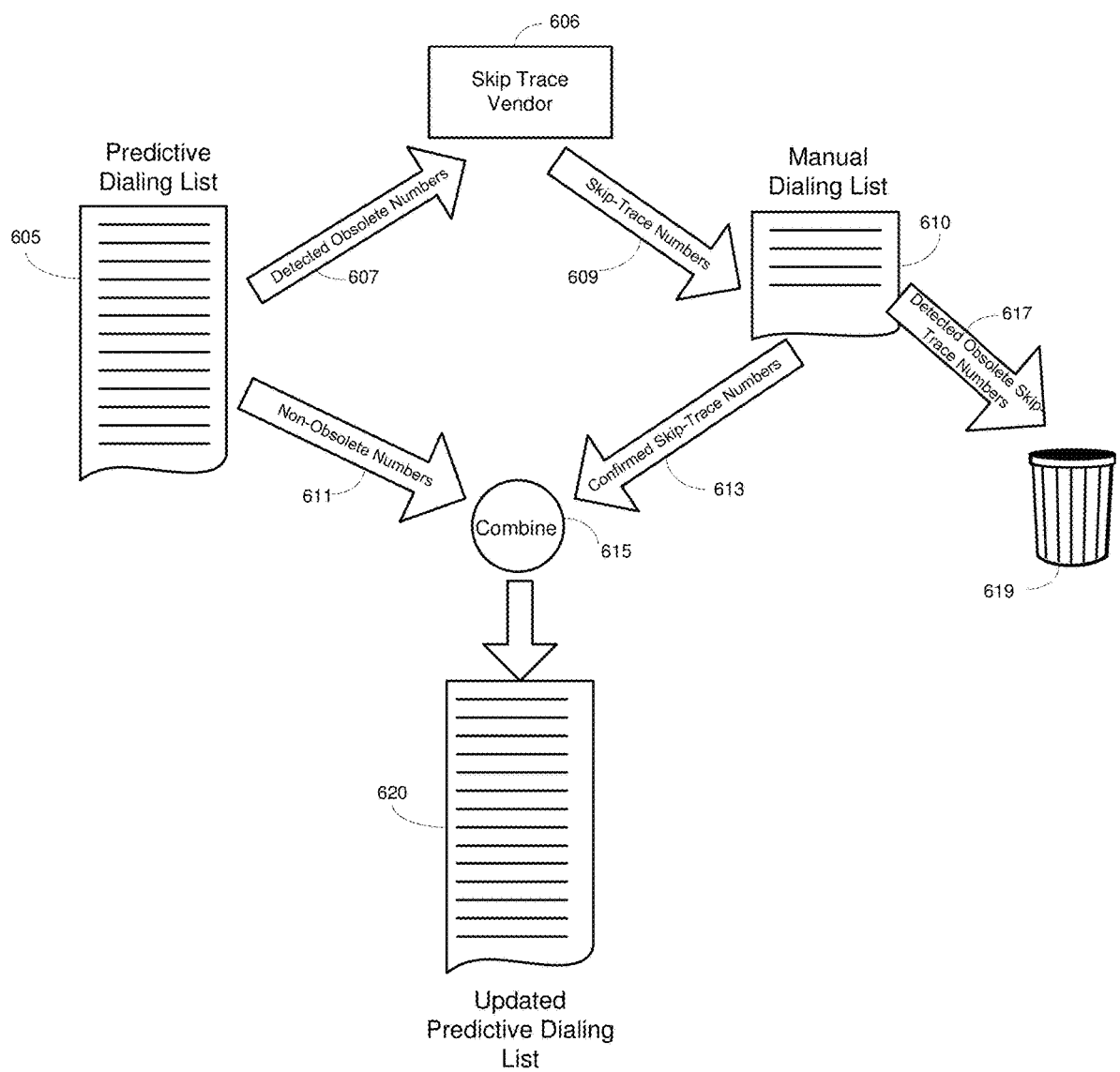
FIG. 6 illustrates one embodiment of the concept for integrating a predictive dialing list with a manual dialing list to produce an updated predictive dialing list.

An embodiment of this overall process is graphically represented in the diagram shown in FIG. 6. The predictive dialing sub-system 505 processes the predictive dialing list 605 and during the course of processing, some numbers may be detected as obsolete represented by the processing arrow 607. These numbers are effectively removed from the predictive dialing list 605 and reported to a skip-trace vendor 606 to obtain replacement current numbers (e.g., skip-trace numbers). The skip-trace numbers are reported back to the contact center as represented by processing arrow 609 and stored in the manual dialing list 610.

The manual compliance dialing sub-system 535 processes the manual dialing list 610 and if any of the skip-trace numbers received are detected as obsolete, then they are discarded represented by processing arrow 617 directed to the garbage receptacle 619. In some embodiments, these numbers may be retained and reported to the skip-trace vendor for receiving a credit as they were not actually correct, but in any case such numbers are not retained in the manual dialing list 610 since repeatedly dialing the obsolete number is unproductive.

After processing the predictive dialing list 605 and the manual dialing list 610 (either simultaneously or serially), the results of the two lists 605, 610 may be merged. Specifically, as represented by the "combine" process 615, the non-obsolete numbers 611 from the predictive dialing list 605 may be merged with the confirmed skip-trace numbers 613 from the manual dialing list 610 to generate the updated predictive dialing list 620. Typically, only a subset of the numbers on the manual dialing list 610 that are dialed during a time period are confirmed as current. Thus, only a subset of the manual dialing list 610 numbers may be combined in operation 615. In summary, the obsolete numbers are removed from the predictive dialing list 605 and confirmed skip-trace numbers are added back into the list 620. The updated predictive dialing list 620 can then be used as the predictive dialing list 605 for the next processing period. Depending on the embodiment, the dialing lists 605, 610 may be processed and updated daily or at the end of each shift. However, it is possible that the time periods for processing and updating may occur more or less frequently, or in real-time (continuously).

Figure 7:
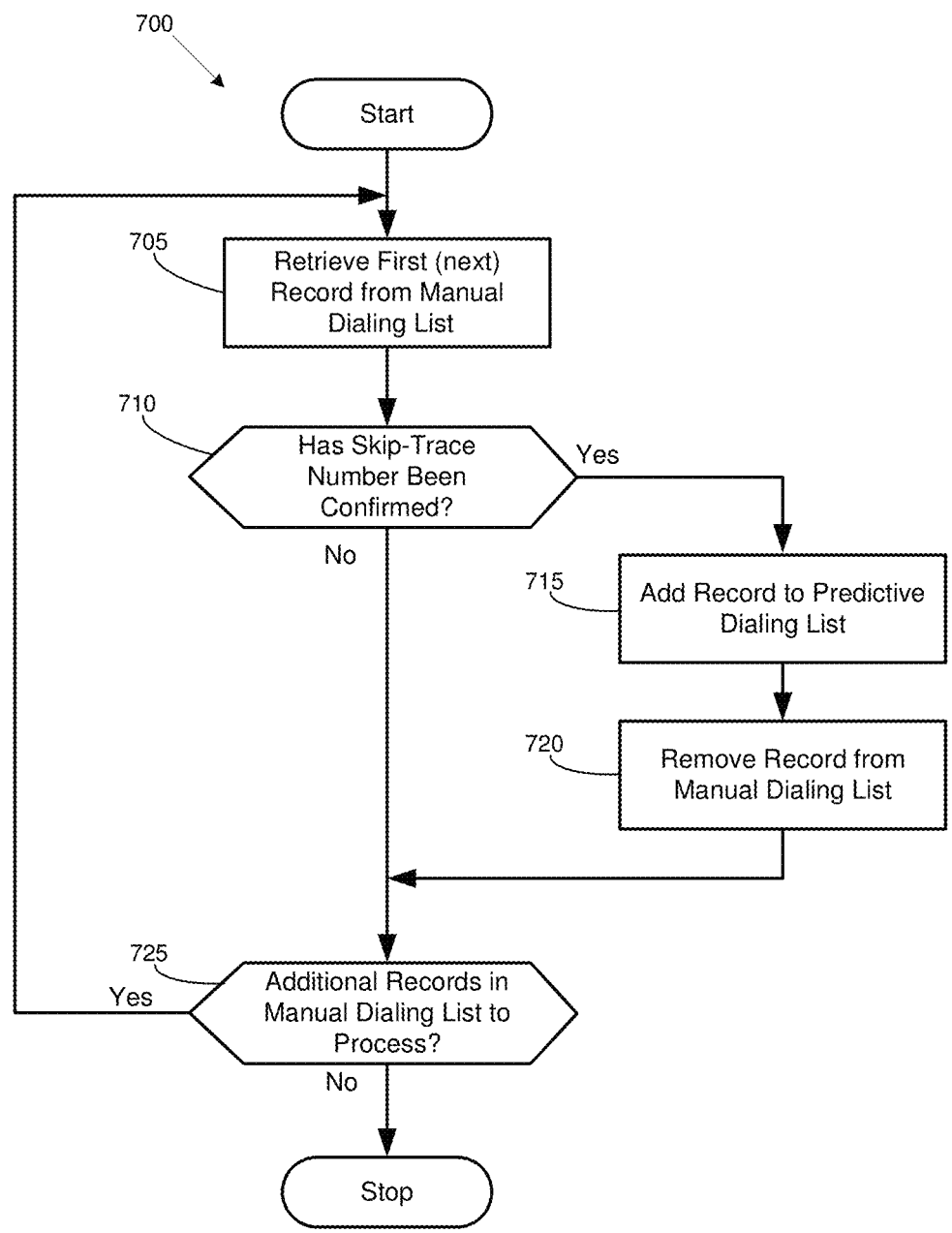
FIG. 7 illustrates one embodiment of a process flow for processing the updated predictive dialing list.

An embodiment of a process flow for the above mentioned "combine" processing function 615 is shown in FIG. 7. This process 700 begins by retrieving the first (or next) record from the manual dialing list 610 in operation 705. If the flag indicates that the skip-trace number has been confirmed in operation 710, then the number is added to the updated predictive dialing list 620 in operation 715 and removed from the manual dialing list 610 in operation 720. In effect, the record is 'moved' from the manual dialing list 610 to the updated predictive dialing list 620 because the number has been confirmed and can be dialed using an ADS. The process then determines in operation 725 if there are any more records in the manual dialing list 610 to process. If there are more records, then the process loops back to operation 705 where the next record is retrieved.

At a subsequent point in time, the manual dialing list 610 may be manually dialed again. As skip-trace numbers are confirmed, these skip-trace numbers are added into the updated predictive dialing list 620 and any further discovered obsolete numbers are removed. Consequently, it can be appreciated that the contents of each dialing list may change over time. New skip-trace numbers are added to the manual dialing list 610 when encountered via dialing of the predictive dialing list 605, and confirmed skip-trace numbers are removed from the manual dialing list 610 when they are confirmed and added back to the updated predictive dialing list 620. It can be appreciated that this may occur at different rates and may impact how frequently the manual dialing list 610 is manually dialed. This same process may be applicable to moving records based on the "Subject to TCPA" field. Specifically, if a record is indicated as not "Subject to TCPA" in operation 710, then it can be added to the predictive dialing list in operation 715.

Single Dialing List

The prior discussion revolved around the generation, maintenance, and use of two distinct dialing lists, which are processed by two distinct systems in the contact center: the predictive dialer sub-system 505 and the manual compliance dialing sub-system 535. However, other embodiments involve the generation, maintenance, and use of a single dialing list that is processed by a hybrid arrangement of components used to accomplish predictive dialing and manual dialing.

Figure 8:
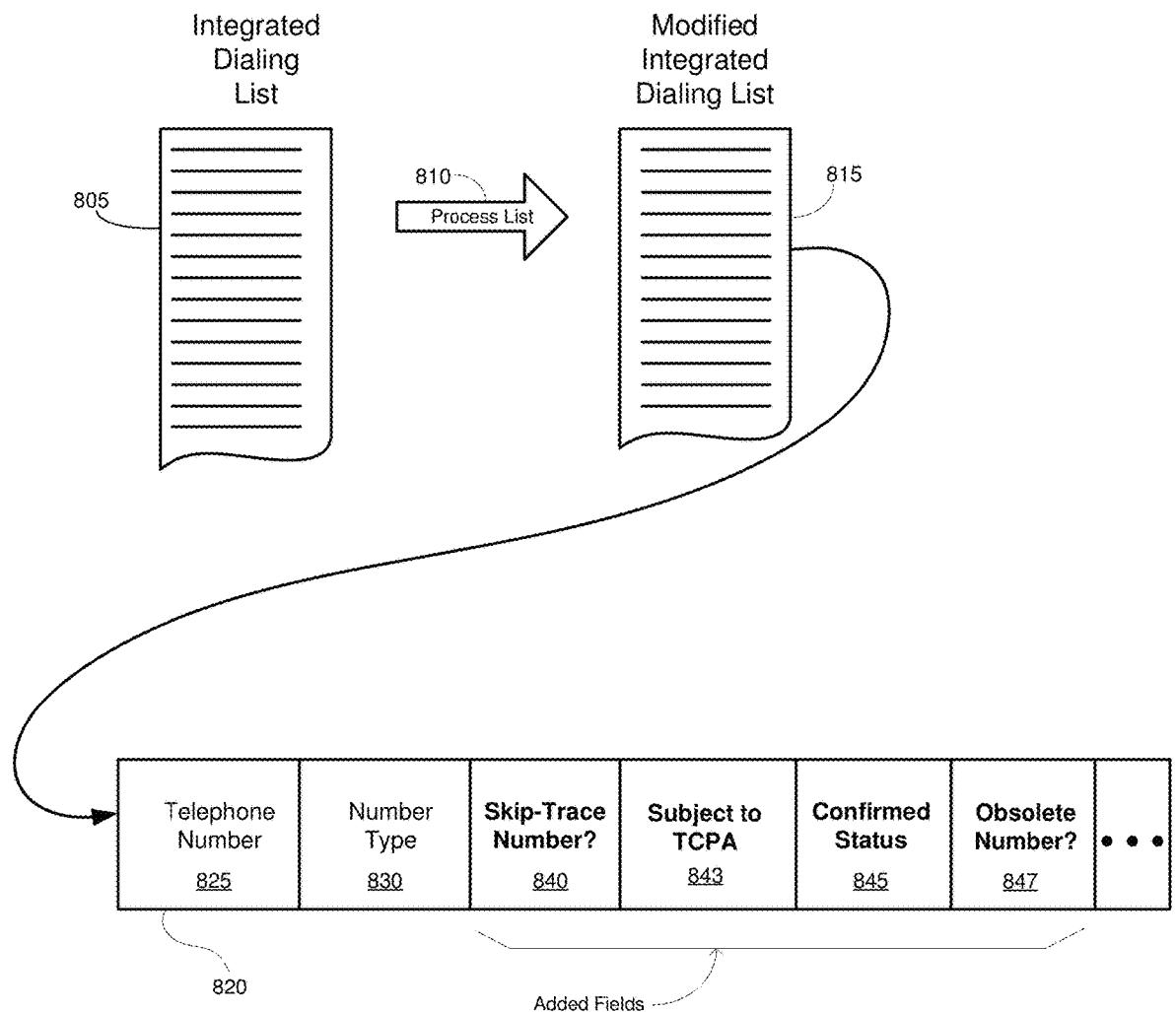
FIG. 8 illustrates one embodiment of the concept of modifying records in an integrated dialing list to accommodate numbers indicated as subject to the TCPA dialer prohibition.

FIG. 8 illustrates the concept of using a single integrated dialing list at a high level according to various embodiments. Turning to FIG. 8, an integrated dialing list 805 is shown. This could be, for example, an original dialing list before any relinquished numbers are detected that necessitated obtaining skip-trace numbers or can be a dialing list that has been previously processed and includes detected obsolete numbers and/or skip-trace numbers.

As the integrated dialing list 805 is processed by the ADS, any numbers deemed obsolete may be indicated as such. In addition, records that indicate unconfirmed skip-trace numbers are dialed manually. As skip-trace numbers are confirmed, the corresponding records are updated to reflect such. Consequently, as processing 810 occurs, a modified (updated) integrated dialing list 815 is produced. This modified integrated dialing list 815 can be used as the integrated dialing list 805 at the beginning of the next day's processing.

Thus, the record structure 820 of the modified integrated dialing list 815 may include, for example, a field indicating a telephone number 825 and a field indicating its corresponding number type 830. Further, this record structure may also include fields indicating whether the number it is a skip-trace number 840, whether the number is subject to the TCPA 843, whether the number has been confirmed or not 845, and/or whether the number is obsolete 847. In various embodiments, the names of these fields may be different. For example, the "Obsolete Number?" field 847 may be called "Disconnected Status" or some other name in other embodiments. The record may also include a "Consent" field (not shown in FIG. 8) indicating whether consent has been provided by the associated party to the contact center to use the number to contact the party. Consequently, these fields may be added to an original record structure found in the integrated dialing list 805 in order to define the modified integrated dialing list 815 to the extent the original record structure does not include these fields. Thus, the record structure 820 for the modified integrated dialing list 815 is merely illustrative, as other record structures can be defined in other embodiments for indicating this information.

Initially, an integrated dialing list 805 may not have any obsolete numbers. However, as the list 805 is processed, some of the numbers on the list 805 may be identified as being obsolete (e.g., relinquished). For instance, as discussed earlier, an obsolete number may be identified by the presence of an intercept announcement or an agent being informed by an answering party that the number is no longer associated with the targeted party. Once a number is identified as obsolete, a field in the corresponding record for the number may be updated. For instance, an indicator may be stored in the "Obsolete Number?" field 847 indicating the number is obsolete.

At some point in time, a skip-trace query can be made for this obsolete number and if a skip-trace number is obtained, then an indicator may be stored in the "Skip-Trace Number" field 840 indicating that the number 825 is a skip-trace number. (Accordingly, the indicator in the "Obsolete Number?" field 847 may be removed.) In addition, since the skip-trace number is not confirmed, an indicator may be stored in the "Confirmed Status" field 845 indicating the number is unconfirmed. Once the skip-trace number has been manually dialed, confirmed, and consent has been obtained to use the number for the targeted party, then an indicator may be stored in the "Confirmed Status" field 845 as appropriate.

In addition, an indicator may be stored in the "Subject to TCPA" field 843 indicating a telephone number for a particular record is subject to the TCPA prohibition. For instance, a skip-trace number may be received for an obsolete number from a vendor that identifies the skip-trace number is a wireless number. Thus in this instance, an indicator is stored in the "Subject to TCPA" field 843 for the record along with the skip-trace number identifying the number as being subject to the TCPA. In another instance, an agent may handle a call placed to a targeted party and the party may inform the agent that the dialed number is associated with a measured service rate plan for which the party is charged for each call to the number. Accordingly, the agent may enter a disposition code (or some other identifier) identifying the dialed number as being subject to the TCPA and the "Subject to TCPA" field 843 for the associated record in the dialing list is updated appropriately.

In other instances, when a telephone number is received for a targeted party in which it may not be clear as to whether the number is subject to the TCPA, the contact center may initially store an indicator in the "Subject to TCPA" field 843 identifying the number as subject to the TCPA or may store an indicator in the "Subject to TCPA" field 843 identifying the number as "unknown" with respect to being subject to the TCPA. For example, VoIP service providers typically offer customers today with several options with respect to receiving service from these providers at a flat-rate or metered. Thus, when the contact center receives a telephone number for a targeted party identified as associated with VoIP service, the contact center may decide to initially handle the number as subject to the TCPA or as "unknown" until the targeted party can be contacted to confirm whether the number is actually subject to the TCPA.

Thus, in various embodiments, a record in a single list with such a record structure 820 can indicate the telephone number, its corresponding type (e.g., wireline, wireless, or VoIP), whether it is a skip-trace number, whether the number is subject to the TCPA, whether the number has been confirmed, and/or whether the number is obsolete. Collectively, such a record structure 820 provides sufficient information to determine whether the telephone number associated with a particular record should be manually dialed or by some other means such as by a predictive dialing sub-system 505 (or other form of ADS). In addition, in particular embodiments, the record structure 820 may include other fields to indicate whether express consent has been obtained for the particular number and/or the scope of the consent. For example, additional fields may reflect whether consent exists for sending text calls, voices calls, or both. Further, consent may be qualified for certain subject matter or at certain times of the day.

Single List Dialing Processing

Figure 9:
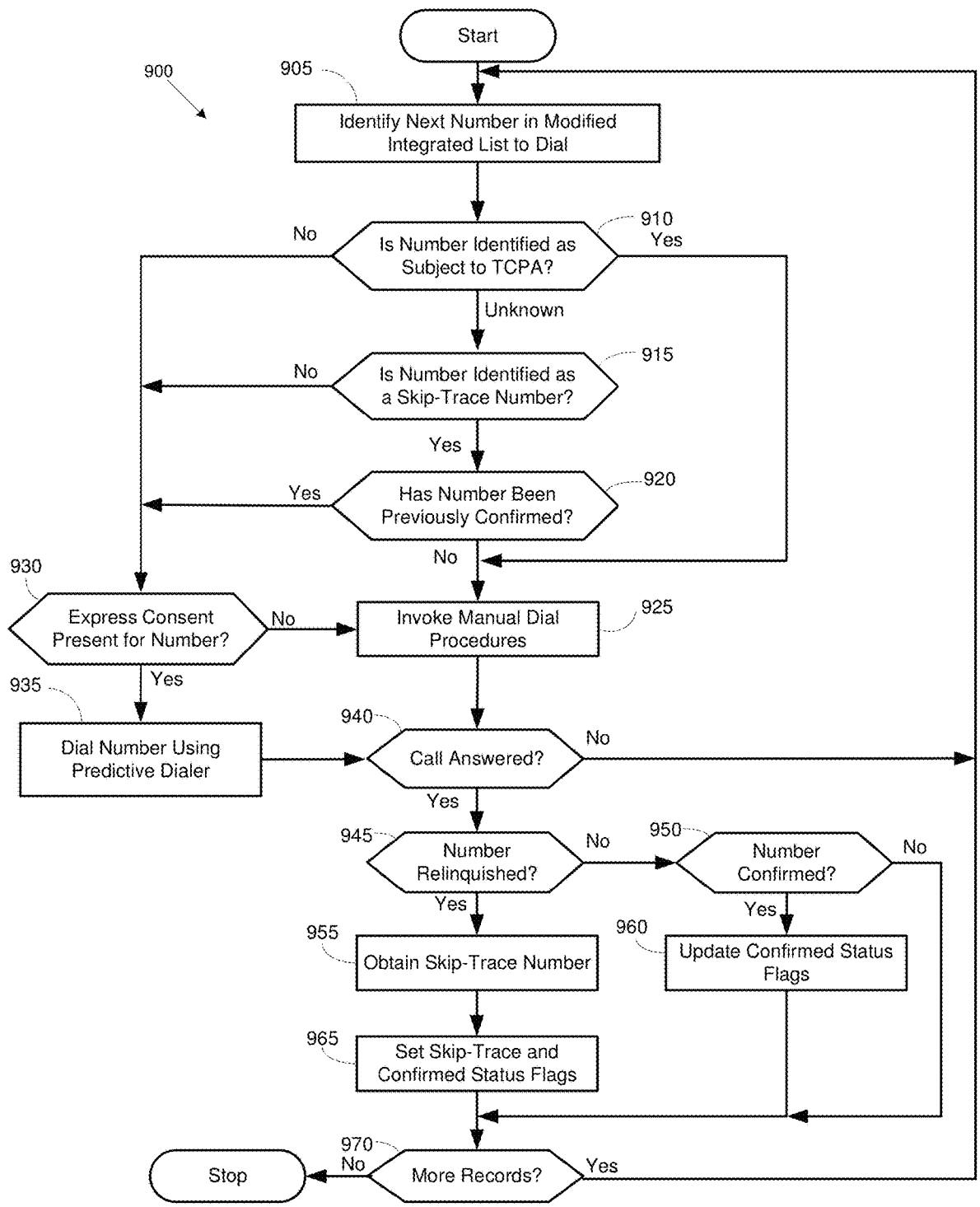
FIG. 9 illustrates one embodiment of a process flow for processing an integrated dialing list including numbers indicated as subject to the TCPA dialer prohibition.

In various embodiments, the processing of a single integrated dialing list may utilize some of the operations associated with processing of multiple dialing lists. Turning now to FIG. 9, this figure provides an embodiment of a process flow for processing an integrated dialing list. Accordingly, the process 900 begins with retrieving the initial (or next) record in the integrated dialing list 805 in operation 905. The number indicated in this record is then analyzed in the context of indicators stored in the record, the order of which may vary depending on the embodiment.

For the embodiment shown in FIG. 9, the "Subject to TPCA" field 843 is analyzed first to determine whether the number is subject to the TCPA in operation 910. In this embodiment, this field is defined to reflect that a number may be 1) subject to the TCPA prohibition, 2) not subject to the TCPA prohibition, and 3) unknown as to whether it is subject to the TCPA prohibition. If the number is known as not being subject to the TCPA prohibition, then the number may be dialed using the predictive dialing procedures in operation 935. However, if the number is known as being subject to the TCPA prohibition or is unknown as to whether it is subject to the TCPA prohibition, then the "Skip-Trace Number" field 840 is analyzed to determine whether the number is a skip-trace number in operation 915. If not, then the number likely is known as being associated with the designated individual (e.g., it is a current number) and processing continues to operation 930. (It is possible that upon dialing the number, the number may be found to be obsolete and a skip-trace number will be requested.)

At this point, a determination is made as to whether consent has been provided by the designated individual to the contact center to use the number to contact the individual. For instance, in particular embodiments, the record structure may also include a field that stores an indicator as to whether the designated individual has provided consent. Thus, for these particular embodiments, the field storing this particular indicator is analyzed to determine whether the designated individual as provided consent.

If the determination is consent has been provided, then the number is dialed using the predictive dialing procedures in operation 935. However, if consent has not been provided, then the number should not be dialed using the predictive dialing sub-system 505. Instead the number should be manually dialed and hence, the process flows to operation 925 where the manual dialing procedures are invoked.

However, returning to operation 915, if the number is a skip-trace number, then the "Confirmed Status" field is analyzed in operation 920 to determine whether the number has been previously confirmed. If the number has been confirmed, then the flow continues to operation 930. Note that in particular embodiments the determination for consent conducted in operation 930 may not be required, since it may be explicitly or implicitly inferred from the number having been confirmed that consent has also been obtained. This depends, in part, on how the "Confirmed Status" field is defined. Thus, operation 930 may be optional in some embodiments.

If the number has not been confirmed in operation 920, then the number is an unconfirmed skip-trace number, which is unknown as to whether it is subject to the TCPA prohibition. Accordingly, this number should not be dialed using the predictive dialing sub-system 505, but instead should be manually dialed. Hence, the process flows to operation 925 where the manual dialing procedures are invoked.

Continuing on, once a call has been dialed either manually or by using the predictive dialing sub-system 505, if the call is not answered in operation 940, then the process loops back to operation 905 to retrieve the next record. Not shown are various so-called "housekeeping" details that may occur in particular embodiments, such as incrementing a call attempt counter for that record, recording data of the time and outcome of the call, noting agent performance, etc. Further, for purposes of simplicity, procedures related to handling various other outcomes (e.g., an answering machine answering the calls) are not detailed. Rather, it is assumed that the call is either not answered, answered by a live party, or encounters an intercept announcement indicating that the number is no longer in service.

If the call is answered, then a determination is made as to whether the number is relinquished (obsolete) in operation 945. Depending on the circumstances, this may be determined by the answering party indicating to the agent that the number has been reassigned from the designated individual or by detecting an intercept announcement indicating the number is no longer in service. If a determination is made that the number is relinquished, then the process flow continues to operation 955 where a skip-trace number is obtained for the obsolete number. Upon receiving a skip-trace number, the "Skip-Trace Number" field and the "Confirmed Status" field are set appropriately in operation 965. Specifically, the "Skip-Trace Number" field is set to indicate the record is for a skip-track number and the "Confirmed Status" field is set to indicate the skip-trace number is unconfirmed. In addition, in particular embodiments, the obsolete telephone number in the "Telephone Number" field may be replaced with the skip-trace number. While in other embodiments, the skip-track number may be stored in another field for the record. At this point, if there are more records to process as determined in operation 970, then the process loops back to operation in 905.

Returning to operation 945, if the outcome is that the number is not relinquished, then the process flow may continue to determine whether the number is confirmed in operation 950 (this may assume that a live person has answered the call). Typically, this occurs by the agent verbally asking the answering party whether they are the intended targeted party, and/or whether the party consents to having the contact center use the number to contact the party. If the answer is "yes," then the "Confirmed Status" field in the record is set in operation 960. If the answer is "no," then the "Confirmed Status" field is not set and the process proceeds to determine if there are any more records to process in operation 970. In addition, although not specifically shown in FIG. 9, one or more consent fields may also be set in various embodiments based on the agent's conversation with the party.

It is noted that the process shown in FIG. 9 is not intended to detail all the operations associated with processing numbers in a dialing list with respect to various embodiments, and simplifies various aspects thereof. With that said, FIG. 9 is intended to illustrate but one embodiment for processing records using a single dialing list where obsolete numbers may be detected, including how to process numbers that are indicated as potentially being subject to the TCPA prohibition, and how to set the appropriate indicators in the call record. Other embodiments may have more or less steps than shown. The process flow shown in FIG. 9 illustrates that a skip-trace number which is unknown as to being subject to the TCPA and that has not been confirmed should not be predictively dialed, but should be manually dialed. Once the skip-trace number has been confirmed (and assuming that express consent exists), then that number can be safely dialed using an ADS or some other automatic dialing technique.

Single List Contact Center Architecture

Figure 10A:
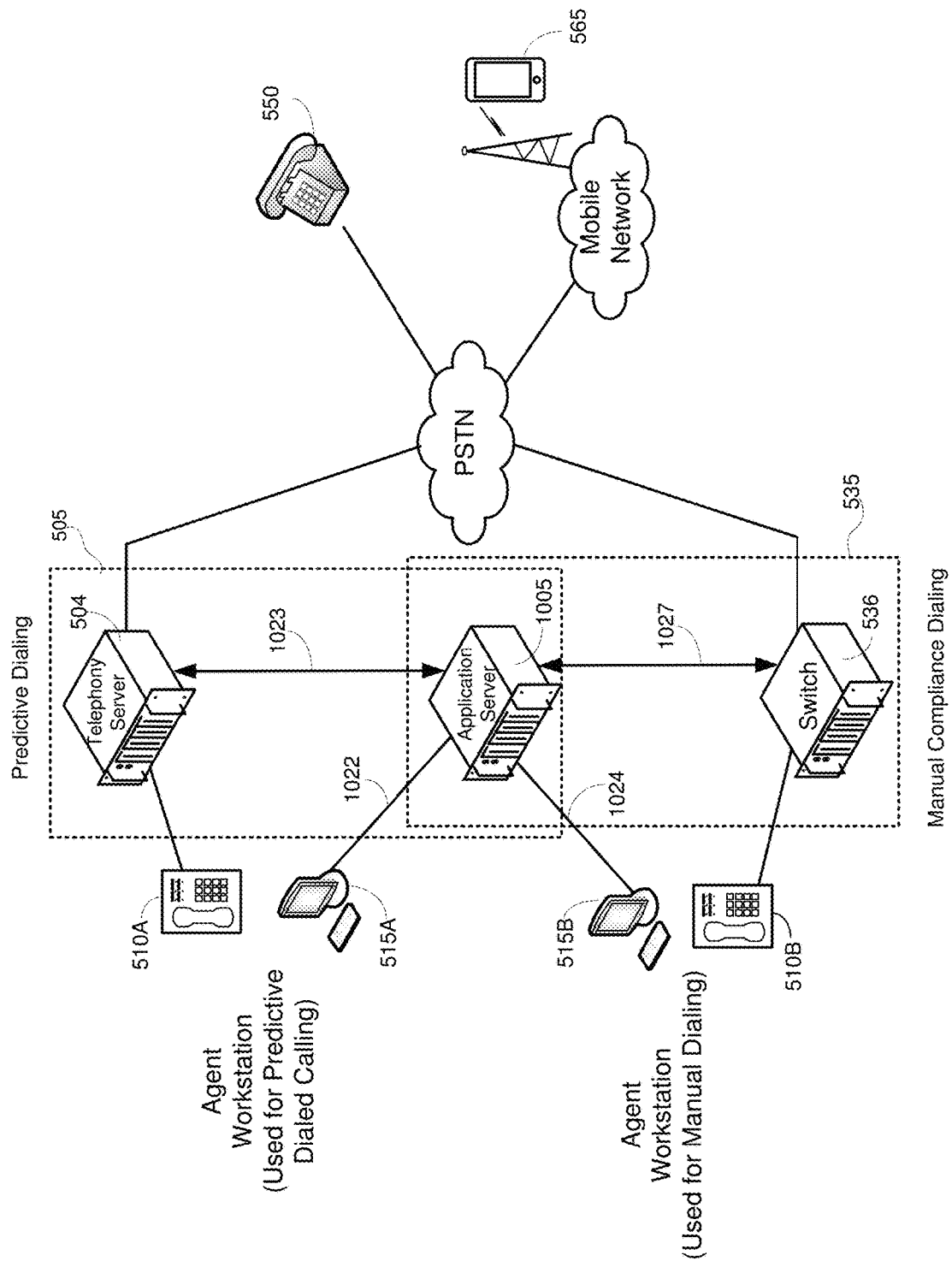
FIGS. 10A-10E illustrate various embodiments of a contact center architecture for dialing numbers using a single dialing list comprising numbers which may or may not be subject to the TCPA dialer prohibition.

In various embodiments, the contact center architecture for processing a single dialing list may be different from the contact center architecture for processing multiple dialing lists that was shown in FIG. 5. One such embodiment for processing a single dialing list is shown in FIG. 10A. One aspect of this embodiment that is different from the architecture for processing multiple dialing lists shown in FIG. 5 is there is a single application server 1005 with a list processing module that provides functionality for both predictively dialed calls and manually dialed calls. In essence, a single application server 1005 is used for both the predictive dialing sub-system 505 and the manual compliance dialing sub-system 535. In other words, the application server 1005 includes the functionality of both the application server 506 controlling the telephone server for predictively dialed calls and the application server 532 communicating with the switch 536 for manually dialed calls shown in FIG. 5. It should be appreciated that although this single application server 1005 includes this enhanced set of capabilities, different subsets are typically used for handling the predictively dialed calls and the manually dialed calls.

Predictive dialing is accomplished using the predictive dialing sub-system 505 which may comprise the telephony server 504 and the application server 1005. Agents use telephones that are connected to the telephony server 504 for handling voice communications. These same agents use computers, but in this embodiment, the computers are connected to the application server 1005 via facilities 1022. The operation of these components cooperates to process the dialing list that is maintained in the application server 1005, as described above.

Thus, in this instance, the application server 1005 may select a number of records in the dialing list that are eligible for predictive dialing and may instruct the telephony server 504 to dial the numbers as appropriate. Upon detecting one of the calls being answered, the telephone server 504 communicates this detection to the application server 1005 via link 1023, and the application server 1005 then presents the appropriate account information on a computer 515A for the agent to view. The agent is then connected to that call using a telephone 510A. In this manner, the agent views information associated with a particular called party with whom the agent is connected with.

Meanwhile, either simultaneously or at a different time, the application server 1005 may also identify records for those numbers in the dialing list that are unconfirmed skip-trace numbers and/or numbers subject to the TCPA that do not have consent and therefore require manual dialing. Upon identifying such a record in the dialing list, the application server 1005 may communicate the number and related account information to an agent's computer 515B over facilities 1024. In particular embodiments, the application server 1005 may only communicate a number to the agent if the number meets a set of compliance requirements allowing the agent to dial the number. For example, a number may only be presented to the agent for dialing if the number can be dialed by the agent within the allowable calling window. The agent, upon viewing the number displayed on his computer 515B, may then use his telephone 510B to manually dial the number. The telephone 510B communicates with a switch 536 to originate the call. Depending on the embodiment, the type of telephone used and the associated protocol used to convey this to the switch 536 may be based on any number of technologies or protocols. The switch 536 may inform the application server 1005 of the call request via link 1027 so that the application server 1005 can track the number that was actually dialed by the agent. The switch 536 then proceeds with originating the call through the PSTN to an appropriate device such as a wireline device 550 or a mobile device 565.

In this architecture, the application server 1005 provides functionality for facilitating predictive dialing using the telephony server 504. It also provides functionality for informing agents of numbers for manual dialing and tracking calls manually dialed using the switch 536. Accordingly, the functionality in the application server 1005 to handle various aspects of predictive dialing may not be required or used when processing information associated with manually dialed calls provided from the switch 536. Likewise, the functionality in the application server 1005 to handle various aspects of manual dialing may not be required or used when processing information associated with predictively dialed calls made by the telephony server 504. Furthermore although the application server 1005 coordinates operation of both the telephony server 504 and the switch 536, the application server 1005 is not involved in actually making calls itself that is left to the telephony server 504 and/or the switch 536.

With that said, there may be a number of functions performed by the application server 1005 that are common with respect to predictively dialed and manually dialed calls. For instance, in particular embodiments, the application server 1005 may ensure that any numbers to be dialed conform to applicable calling windows, regardless of whether the numbers are dialed predictively or manually. In addition, in particular embodiments, the application server 1005 may enforce limiting the number of calling attempts for any numbers to be dialed within a specified time frame, regardless of whether the numbers are dialed predictively or manually. Other functions that may be common for both types of call origination include logging and reporting call attempts, outcomes, durations, measuring agent performance, handling unanswered calls, recording call dispositions, recording calls, etc.

Figure 10B:
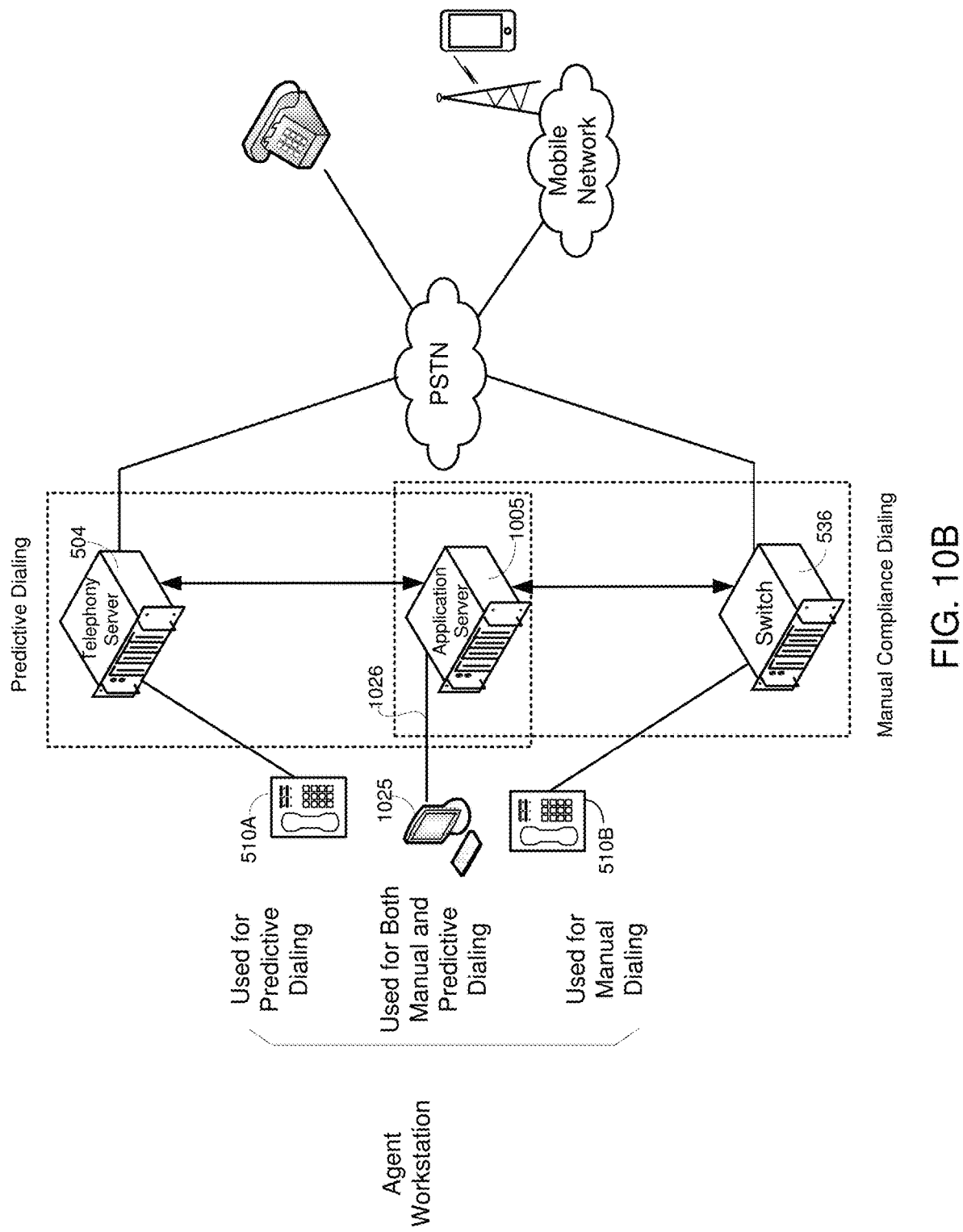

FIG. 10B illustrates another embodiment of a system using a single application server 1005 for coordinating predictively and manually dialed calls. A contact center operator may desire that a single agent in a single workspace can be assigned to handle both predictively and manually dialed calls. Thus, in this embodiment, an agent can do one type of call or the other at different times. For instance, an agent may handle predictively dialed calls for part of a shift and then manually dialed calls for the remainder of the shift. While in other instances, the agent may switch from one call type to another on a periodic basis such as daily or hourly, or even alternate on a call-by-call basis.

In the embodiment shown in FIG. 10B, an agent uses a common computer 1025 in communication 1026 with the application server 1005 for viewing account information for both predictively dialed connected calls and manually dialed calls. The agent may then use one of two telephones located in his or her workspace, either telephone 510A for conversing on a predictively dialed call or telephone 510B for conversing on a manually dialed call. Again, the application server 1005 is not used for establishing either type of call per se, just processing the dialing list and coordinating/communicating with the other components that actually place the calls, namely the telephony server 504 and the switch 536.

Figure 10C:
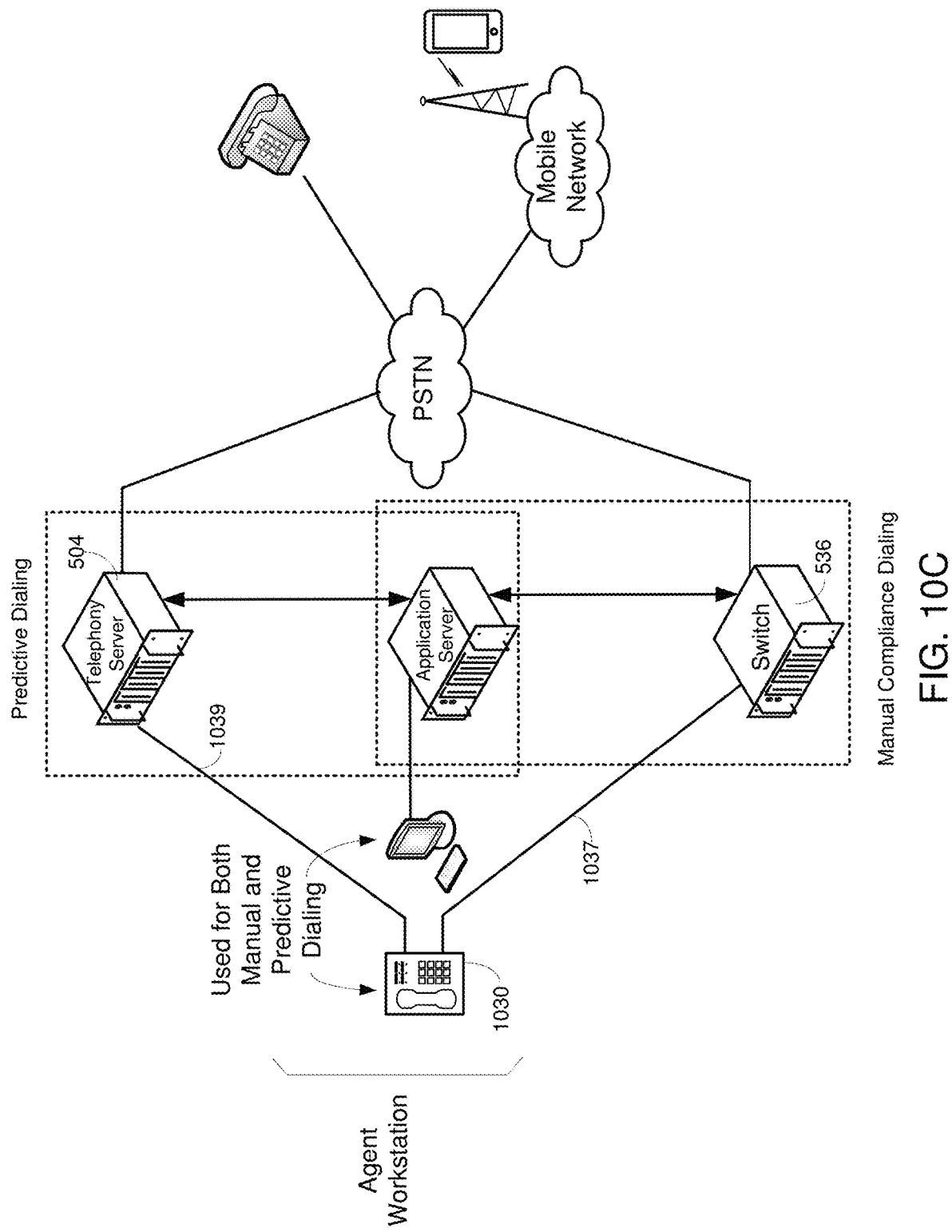

Another embodiment is shown in FIG. 10C. In this embodiment, a single "two-line" telephone 1030 is used by an agent instead of having two telephones in the agent's workspace. For instance, the phone 1030 may be a hard-wired phone as is known to those skilled in the art that is capable of handling two separate phone lines. Further, this phone 1030 could be either a logical or physical telephone. In this instance, the first line 1039 for the phone 1030 is used to communicate with the telephony server 504 for predictively dialed calls and the second line 1037 for the phone 1030 is used to communicate with the switch 536 for manually dialed calls.

Figure 10D:
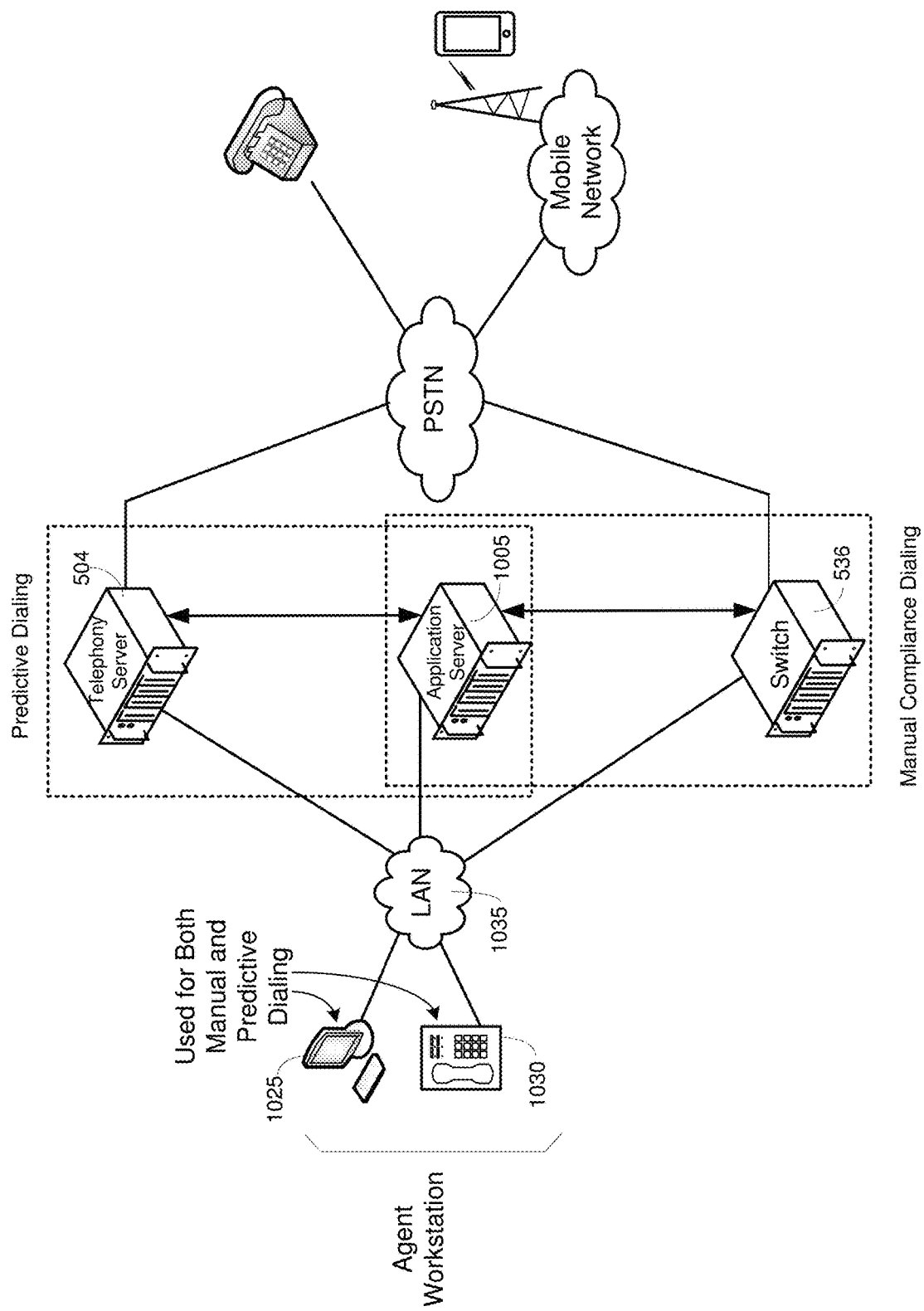

FIG. 10D illustrates another embodiment that further alters the communication aspects of the telephone 1030. In FIG. 10D, a LAN 1035, or other similar facility, is used to facilitate communication between the agent's telephone 1030 and either the telephony server 504 or the switch 536 as required. The same LAN 1035 can be used to interconnect the computer 1025 with the application server 1005. Thus, FIG. 10D can be viewed as a slightly different logical variation of a single telephone 1030 being used for different call types at different times. Accordingly, in this embodiment, the agent's workstation comprises a single logical telephone 1030 and a computer 1025 that can be used for manually or predictively dialed calls.

Figure 10E:
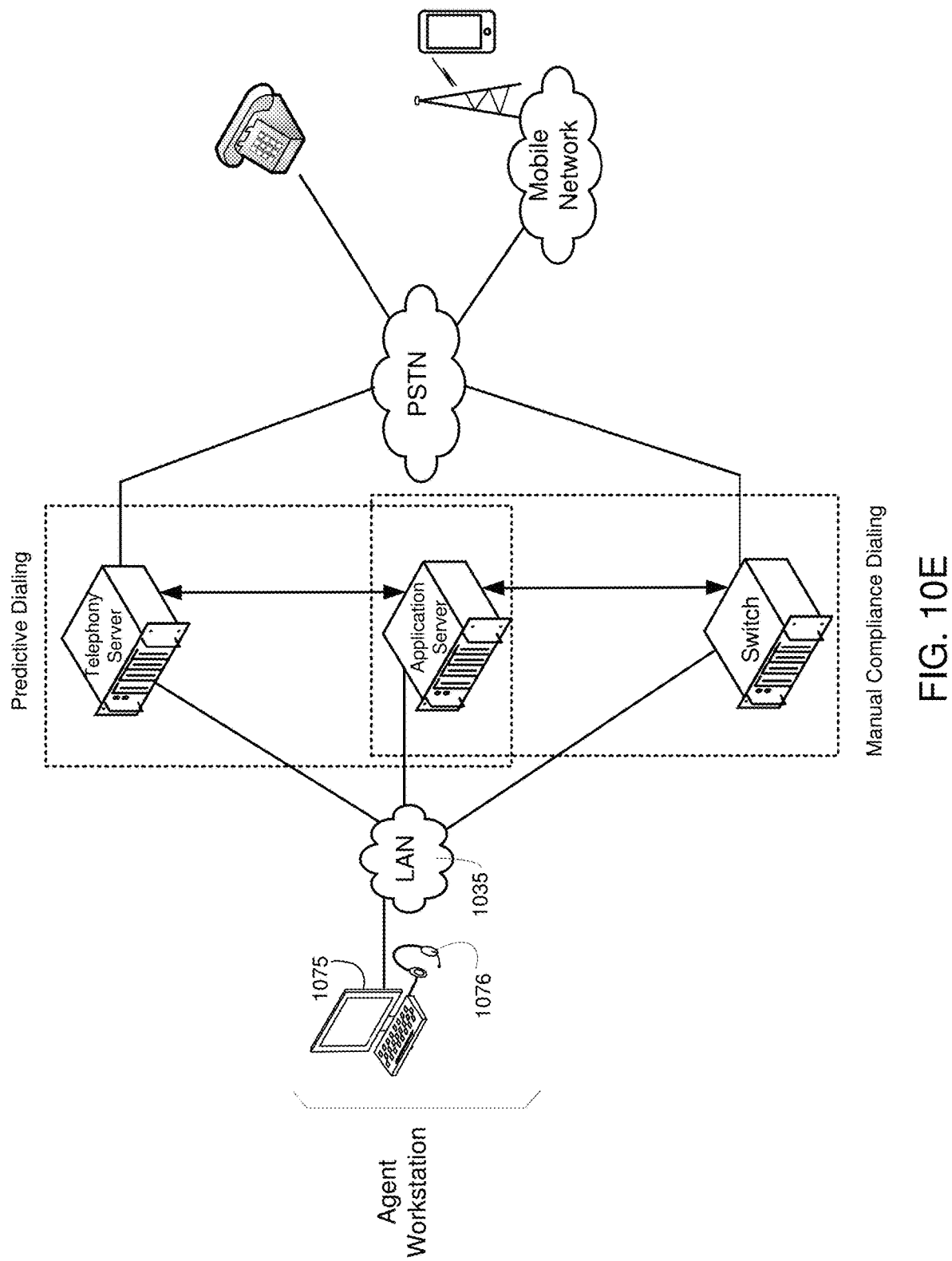

Finally, FIG. 10E illustrates another embodiment wherein the functionality of the telephone is implemented in the agent's computer 1075. This is commonly referred to as a so-called soft-phone in which telephone functionality is implemented via software in the computer 1075. By adding a headset 1076, the computer 1075 can process both speech-in and speech-out for a call. Such soft-phones are well known in the art, and may rely on various technologies, such as using the session initiation protocol ("SIP"). In this embodiment, the computer 1075 is also connected to the LAN 1035, and the physical connection between the computer 1075 and LAN 1035 may carry both data and digitized voice on separate logical channels.

It should be mentioned that in particular embodiments, the various arrangements for interconnecting the telephone and computer in the agent's workstation space as shown in FIGS. 10B-10E may also be applied to the architecture 500 shown in FIG. 5. Thus, depending on the embodiment, it is possible for a single workspace to comprise a single computer and/or a single phone that can operate with both the manual compliance dialing sub-system 535 and the predictive dialing sub-system 505 shown in FIG. 5.

However, regardless of the embodiment used (e.g., FIGS. 10A-10E, or some other alternative), an agent is presented with an unconfirmed skip-trace number or a number that is subject to the TCPA prohibition on his computer that the agent then manually dials using a phone device. The dialing may be accomplished by the agent pressing digits for the number on a keypad or dial pad on a physical phone, selecting the digits for the number on a screen using a pointing device, simply selecting the number on the screen using the pointing device (click-to-dial), or via some other technology.

Assuming a call initiated by an agent for an unconfirmed skip-trace number reaches a live person, the agent typically confirms with the live person whether the person is the intended/targeted party. That is say the agent confirms with the live person whether the number is current for the intended party and/or whether the number is authorized to be used by the contact center to reach the intended party (e.g., request consent). Once confirmed, the agent may then enter a disposition code into his computer that is communicated to the application server so that the appropriate field(s) in the record for the number are updated to reflect the number has been confirmed. As a result, in particular embodiments, the number no longer needs to be manually dialed when the list is processed again by the application server and can be predictively dialed if the live person has provided consent to do so.

Figure 11:
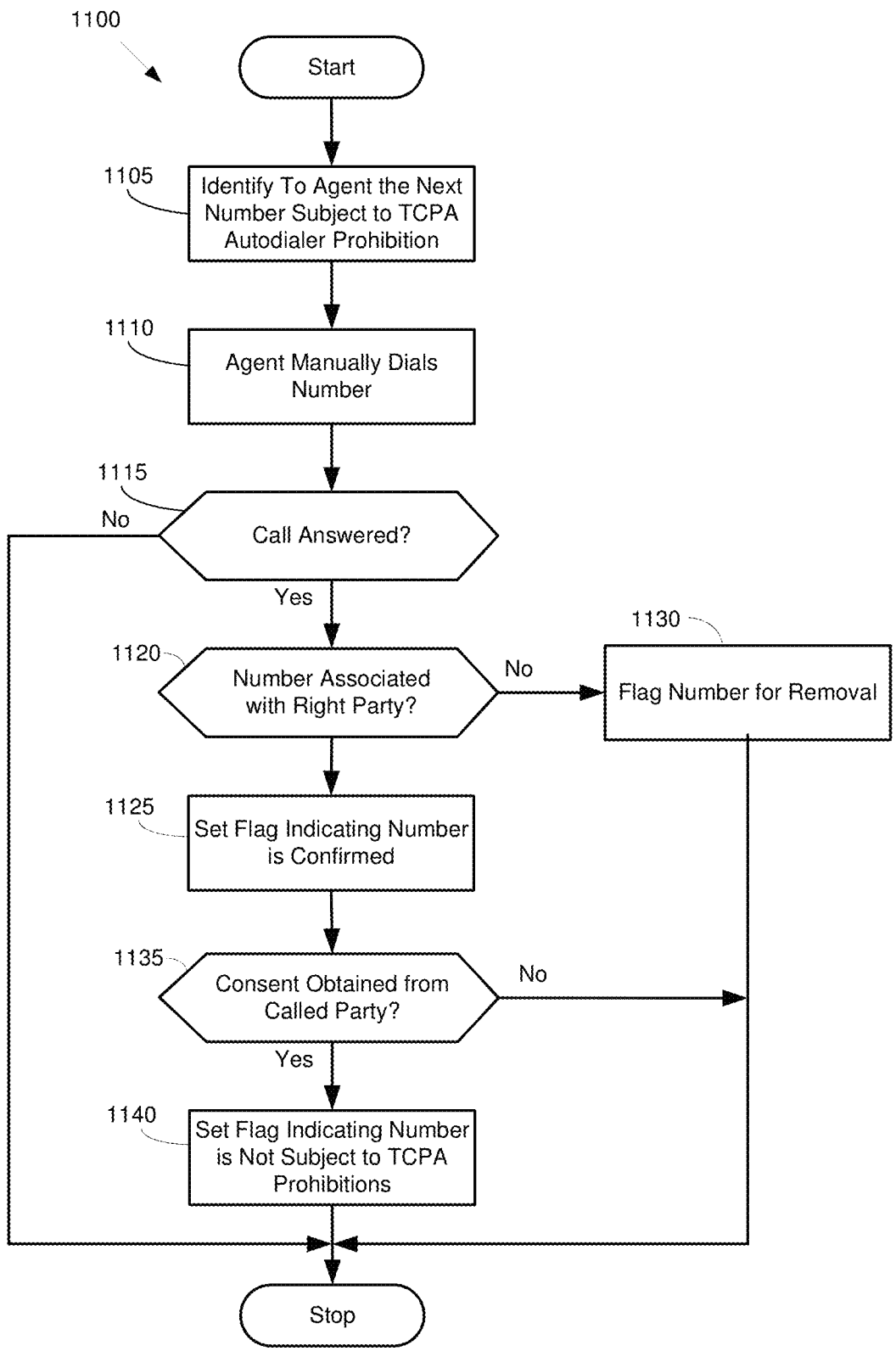
FIGS. 11-12 illustrate embodiments of process flows associated with processing a single dialing list.

An embodiment of a process flow for an agent confirming a number subject to the TCPA prohibition is shown in FIG. 11. For this particular embodiment, the process 1100 begins with the application server identifying the next number to manually dial and presenting this number and related account information to an agent on his computer in operation 1105. In turn, the agent reviews the information then manually dials the number using the telephone at his workspace in operation 1110. If the call is not answered in operation 1115, the process is completed. (In other embodiments, the application server may retrieve the next record to manually dial by looping back to operation 1105.)

However, if the call is answered by a live party in operation 1115, then the agent may inquire whether the number is associated with the intended party in operation 1120. If not, the number is obsolete and the agent enters a disposition code indicating such. For instance, the agent may enter a disposition code to flag the number for removal from the dialing list in operation 1130.

However, if the number is confirmed as being associated with the intended party in operation 1120, then the agent enters a disposition code to flag the number as confirmed in operation 1125. Similarly, the agent may also inquire whether the number can be used to contact the intended party in operation 1135. If so, then the number can be indicated in the dialing list for use in future predictive dialing. This is accomplished by setting the flag in operation 1140 indicating that the number is not subject to the TCPA prohibition. That is to say, in this instance there is no need to segregate the number any further for manual dialing once it is confirmed. If consent is not obtained in operation 1135 to call the number, then the process effectively skips operation 1140, and the process is completed for that record.

Thus, in various embodiments, regardless of whether a single-list or dual-list architecture is used in the contact center, once the call reaches the individual, the agent is able to confirm and obtain consent from the live party who provides confirmation. Accordingly, the application server can then set the appropriate indicator(s) in the record so that the associated number can be processed properly in the future.

Figure 12:
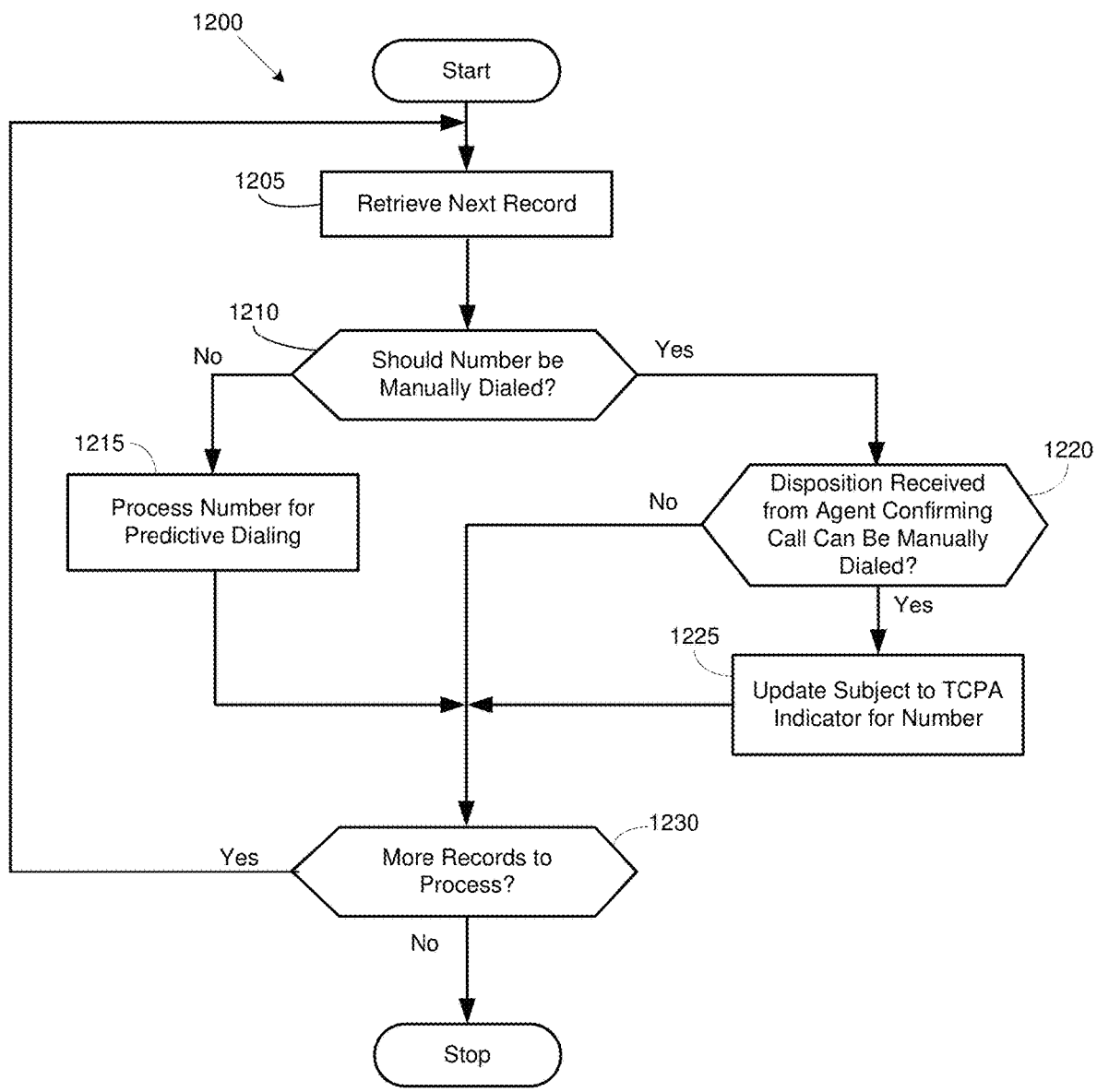

FIG. 12 illustrates an embodiment of a process flow at a high level when the application server processes a single integrated list. Turning to FIG. 12, the process 1200 begins with the application server retrieving the next record in the dialing list in operation 1205. Based on the various fields in the record, the application server determines in operation 1210 whether the number should be manually dialed. That is to say, the application server determines in this instance whether the number is a number that is subject to the TCPA prohibition. If the application server determines the number is not subject to the TCPA prohibition, then the record can be predictively dialed in operation 1215. However, if the application server determines the number is subject to TCPA prohibition, then the process flow continues to operation 1220 where the server determines whether confirmation has been received from an agent who has confirmed the skip-trace number with an answering party. If confirmation has been received, then the application server updates the confirmation indication field in the record in operation 1225. If not, then the flag remains unchanged. In either case, processing for the record is completed and the application server determines in operation 1230 whether there are additional records to process in the dialing list.

Although the process flow shown in FIG. 12 pertains to a single integrated list, many of the operations for this process flow are similar for processing a dual-list approach. For instance, upon confirming a skip-trace number found in a manual dialing list 220 in operation 1220, the application server could remove the record from the manual dialing list and added the record to the predictive dialing list 220.

Summary

Figure 13A:
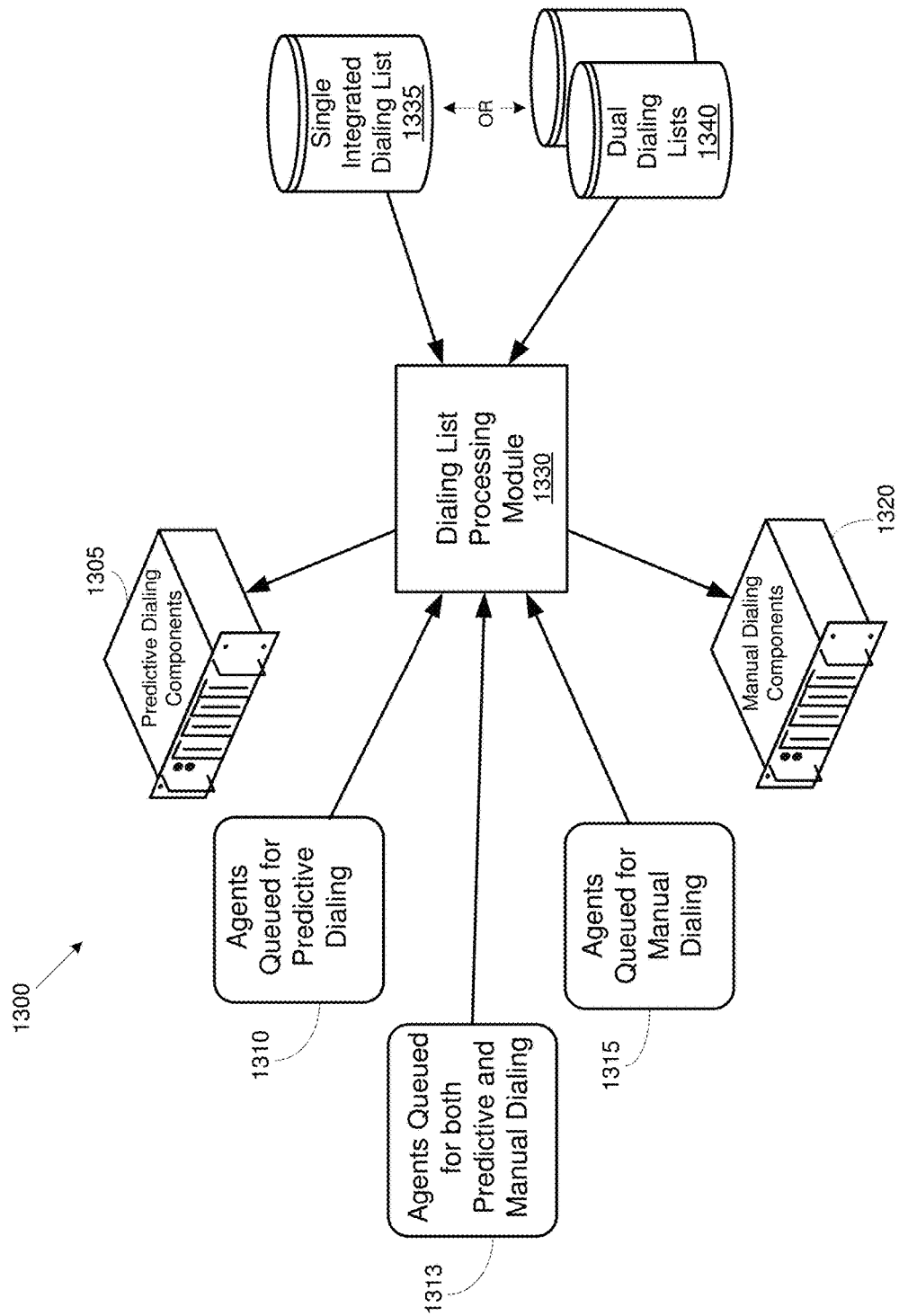
FIGS. 13A-13B illustrate the concept of multiple agent groups and queues for processing numbers by a dialing list processing module incorporated into a system for practicing the concepts and technologies disclosed herein.

FIG. 13A illustrates an embodiment of a dialing list processing module 1330 in a system 1300 constructed according to the principles and concepts disclosed herein. For this particular embodiment, the dialing list processing module 1330 manages and processes one or more dialing lists that can either be a single integrated dialing list 1335 or in dual dialing lists 1340. Other hybrid arrangements are possible, since a single list can be logically viewed as multiple lists by applying the appropriate filters and processing algorithms.

Accordingly, the dialing list module 1330 retrieves an appropriate list and processes each number in the list according to whether the number can be dialed using an ADS, such as a predictive dialer, or whether the number should be dialed manually. If the number can be processed using an ADS, then the dialing list module 1330 coordinates with the appropriate predictive dialing components 1305. In various embodiments, the dialing list module 1330 may maintain a queue of agents allocated to predictive dialing 1310 and provide the appropriate amount of numbers to the predictive dialing components 1305 so as to keep the queue of agents 1310 busy without overwhelming the agents or causing an excessive number of calls to be abandoned. While in other embodiments, the predictive dialing components 1305 (not the dialing list module 1330) manage the queues of agents 1310 and communicate with the dialing list module 1330 when additional numbers are needed.

In particular instances, if a number needs to be processed via manual dialing, then the dialing list module 1330 maintains a queue of agents for manual dialing 1315. If agents are available, the dialing list module 1330 coordinates and provides the information to the manual dialing components 1320. Other variations in this architecture are possible as well. For example, in other embodiments, the dialing list processing module 1330 may interact with agents that can be selected for both predictive and manual dialing 1313. Although an agent may be in a set of agents which are able to handle either manually or predictively dialed calls, at any given time, the agent is usually involved in one or the other, but not both simultaneously.

Depending on the embodiment, the dialing list module 1330 may be implemented in one or more components, such as the aforementioned application server, that are considered as part of the manual dialing components 1320 and/or part of the predictive dialing components 1305. Further, the various components described herein may be premised-based (e.g., co-located with the agent workstations) or may be remotely located from the contact center (cloud-based). For instance, it may be possible to have a premised-based switch in a contact center communicating with a cloud-based application server for processing manually dialed calls.

Figure 13B:
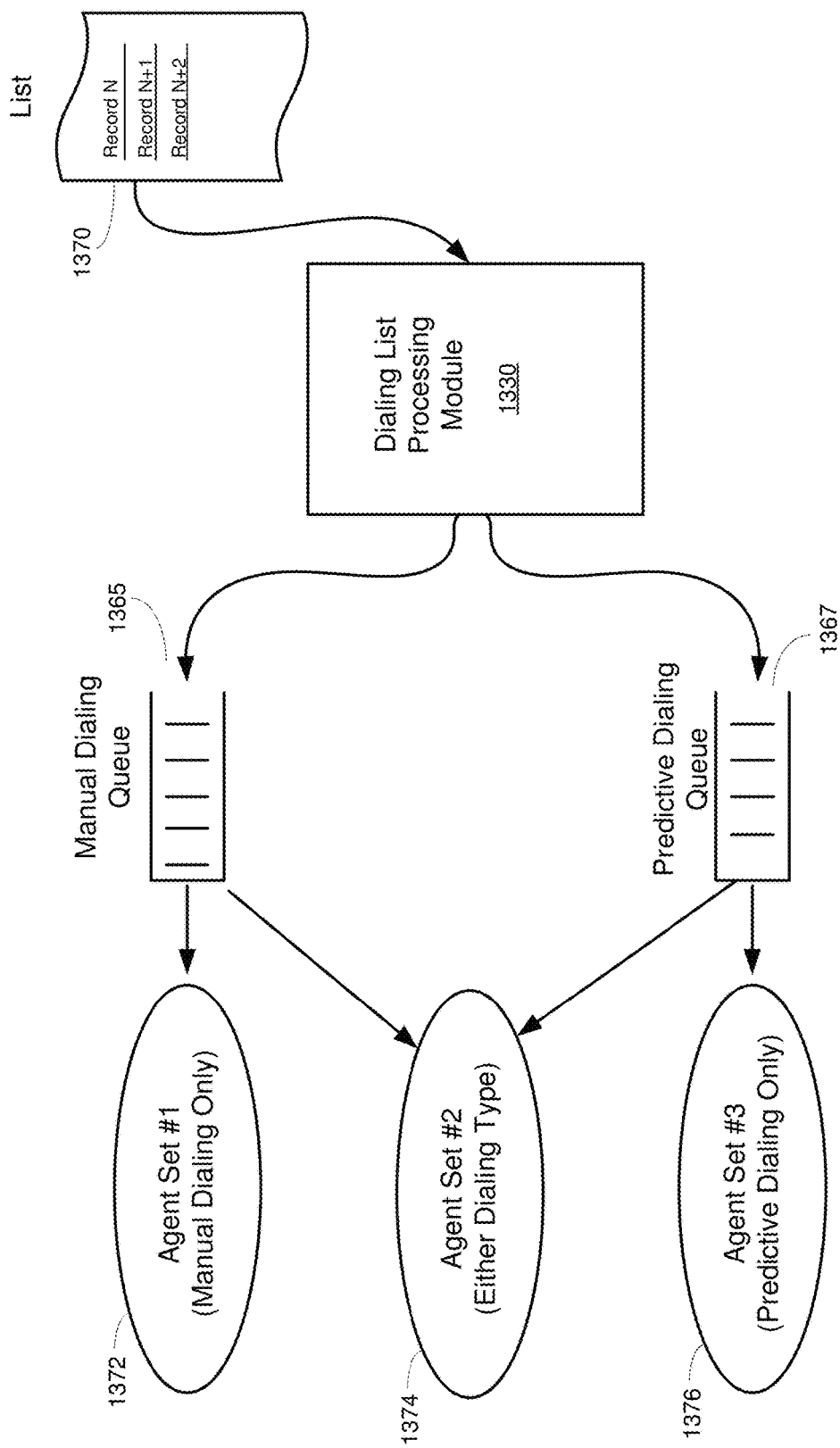

FIG. 13B illustrates a logical illustration of how the dialing list processing module 1330 may fetch a number of records from a list 1370. The list may be one of the previously mentioned integrated lists. The dialing list processing module may examine various fields in each record and place the telephone number to be dialed in either a manual dialing queue 1365 or a predictive dialing queue 1367.

Each queue, in turn, manages a group of agents in a set. In this embodiment, there are three sets. An agent set #1 1372 is a group of agents which are available for manual dialing. These agents only handle calls in the manual dialing queue. Another agent set #3 1376 is a group of agents which are available for predictive dialing. These agents only handle calls associated with the predictive dialing queue. Finally, there may be a group of agents, shown as agent set #2 1374, which can handle either manually dialed or predictively dialed calls.

Figure 14:
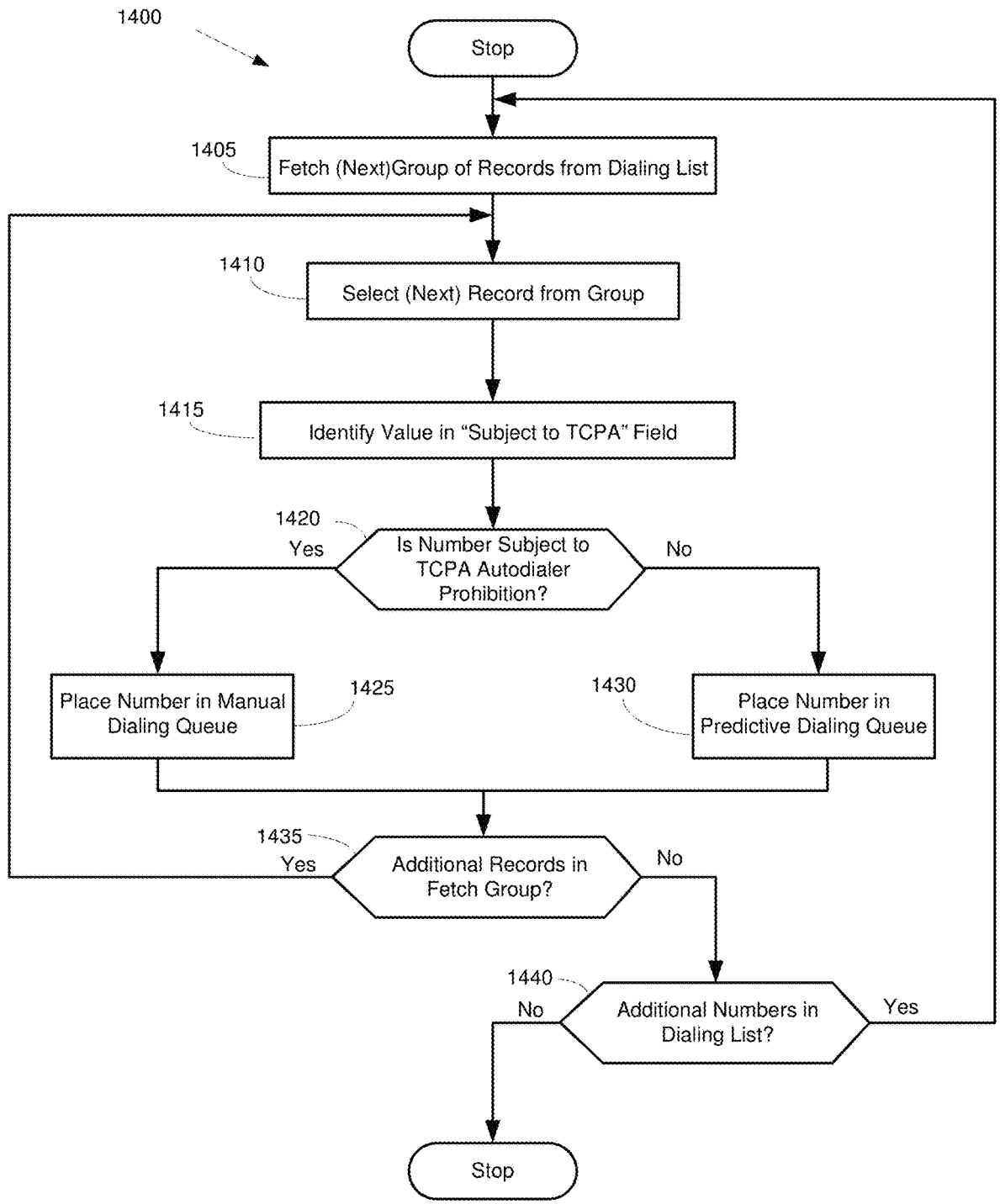
FIG. 14 illustrates a high level process flow of a fetch procedure for processing records in a dialing list.

A process flow associated with the processing list module 1330 is shown in FIG. 14. In FIG. 14, the process flow 1400 begins with fetching a group of records from the dialing list in operation 1405. Typically, for efficiency reasons, more than one record is obtained from the dialing list at a time. This set may be referred to as a "fetch group." For instance, in one example, the fetch group could be 32 records. Once fetched, the records are processed one at a time, so the next appropriate record from the fetch group is selected in operation 1410. Next, the record is parsed so as to identify the value (indicator) stored in the "Subject to TCPA" field in operation 1415.

If the number is determined to be subject to the TCPA prohibition in operation 1420, then the "Yes" branch is followed and the number is placed in the manual dialing queue in operation 1425. If the number is determined not to be subject to the TCPA prohibition in operation 1420, then the number is placed in a predictive dialing queue in operation 1430.

In any case, the process continues by testing whether there are additional records in the previously obtained fetch group in operation 1435. If "Yes," the process loops back to repeat the process in operation 1410. If "No," the process then determines whether another group of records can be fetched in operation 1440. If there are additional records, then the process loops back to operation 1405, where the next group of records is fetched. If there are no further records, then the "No" branch is followed in operation 1440, which terminates the process. In this manner, all the records in the dialing list may be processed.

Other Embodiments

Applications of various embodiments of the invention are disclosed herein as illustrated in the context of a debt-collector attempting to reach a debtor, and involve the use of skip-trace numbers where the current number for the debtor is obsolete. However, the principles and technologies disclosed herein are not limited in applications to only this context and can be applied to any context where a new or replacement number is obtained for a dialing list. For example, instead of obtaining a current number from a skip-trace vendor, a telephone number information provider or directory service provider may be queried to obtain the current number.

In addition, in particular instances any unconfirmed number detected in a dialing list may provide a basis for a contact center operator to segregate out that number for manual dialing. For example, a party may have consented to be called using an autodialer on a specific number. However, the party may later indicate a new number that should be used. In this instance, the indication may not be clear as to whether the new number can be dialed using an autodialer and/or the old number should not be used. Therefore, the contact center may identify the new number as unconfirmed so that the number is dialed manually until a clear confirmation of consent is obtained from the party that the new number may be used to call him using an autodialer.

In another example, a party may have provided a wireless number with consent to receive a text message. However, it may not be clear whether the consent also applies to receiving a voice call. In this instance, the contact center may maintain information in the record indicating the consent and confirmation apply to sending text messages but that dialing the number using an autodialer for a voice call is unconfirmed. Therefore, until consent has not been obtained for a voice call, the contact center manually dials the number. Thus, it is possible that the "Subject to TCPA" field may contain sub-fields which indicate what type of call the prohibition applies to. Consequently, the concepts and technologies may be used separately for text and voice calls to a number.

Further, in particular instances, a party may expressly withdraw his consent for being autodialed for a particular call type on a particular number. For example, the party may indicate that he does not want to receive any more voice calls at that number but will accept text messages. Accordingly, an agent may enter a disposition code that causes the appropriate field(s) in the call record for this party and number to be updated to reflect that consent has been withdrawn for voice calls. This may be the same default setting that is used until consent is expressly received. Thus, it is possible that a number may be confirmed and predictively dialed. However, an agent, upon speaking with a party at a subsequent time, may receive an indication that consent is withdrawn.

Thus, it should be evident that various embodiments of the procedures described above with respect to a confirmed number are also applicable to a consented number or a number that is subject to the TCPA prohibition. Consequently, just as an agent may encounter a person informing the agent the number is obsolete, an agent may encounter a person revoking consent for the number used. The agent could similarly enter a disposition code into their computer used at their workspace indicating that either consent has been altered or that the number is modified with respect to its status as being subject to the TCPA autodialer prohibitions. The entry of the disposition code may update the corresponding field(s) in the record (e.g., the "Subject to TCP" or "Consent" field) that would cause the system to process this number in a dialing list for manual dialing, as opposed to predictive dialing. Which field(s) are updated may vary in different embodiments. Thus, in this instance, a number that does not have consent is treated similar to an unconfirmed number.

It should also be apparent that the particular embodiments described herein are illustrative. For example, the names and format of the particular fields in the records for the dialing lists disclosed herein may vary from one embodiment to another. The processes used for establishing and updating the lists may vary as well. Those skilled in the art will recognize in light of this disclosure that various alternatives are possible to accomplish the indicated functions.

Application with Preview Dialing

The above description has been illustrated using an ADS that may be a predictive dialer. However, in particular embodiments, other forms of dialers may be used such as those known in the industry as power dialers, preview dialers, and other forms. Preview dialing is a form of dialing that involves presenting information to an agent that typically includes the name and account information associated with a record in a dialing list to allow the agent the opportunity to study the account prior to establishing a call to the party. In various embodiments, the information is displayed to the agent for a fixed amount of time, after which the ADS automatically initiates a call to the corresponding number. In other embodiments, the agent may review the information until he is ready to handle the call, at which time the agent may indicate to the ADS to initiate the call.

Accordingly, the concepts and technologies described herein can be used with preview dialing in various embodiments. For instance, a call that was previewed dialed by an ADS may encounter an obsolete number and an agent may indicate a corresponding disposition code. As a result, the ADS may obtain a skip-trace number and later when the same record is encountered again, the ADS may determine that the number is an unconfirmed skip-trace number that should be manually dialed.

Seamless Transition to Manual Dialing Upon Encountering a Skip-Trace Number

As discussed above, a batch request for one or more skip-trace numbers may be made after processing a dialing list at various times and thus, a significant period of time may occur between first encountering an account with an obsolete number and attempting to contact the account again using a skip-trace number. Further, as noted above, an agent may study the details of an account prior to placing a call. Though this may be for a relatively short time (e.g., 30 seconds), it is evident that this process is typically repeated if the account is dialed again at a later time. In addition, it is certainly possible that a different agent may be handling the reattempt using the skip-trace number. Such occurrences reflect a duplication of agent time in studying the account details.

To address this issue and to avoid the duplication in effort, embodiments may seamlessly transition to manual dialing using the concepts and technologies disclosed herein. Specifically, after encountering an obsolete number (regardless of the form of ADS dialer) and the agent entering the disposition code, the ADS may be configured to initiate a skip-trace query in real-time and assuming a number is returned, update the record accordingly. Then, the ADS may indicate to the agent that a skip-trace number has been obtained and should be dialed manually. The agent can then manually dial the number and assuming the call is answered, the agent is then able to confirm the number and enter the appropriate disposition code accordingly. In this way, the agent is able to seamlessly migrate from processing an automatically dialed call to a manually dialed call upon encountering an obsolete number. Once the skip-trace call is completed, the ADS may transition that same agent back to automatically dialed calls. In such an embodiment, the system may update the "Subject to TCPA" field to appropriately reflect whether manual dialing should occur or whether autodialing is allowed.

In this mode of operation, it is usually desirable in various embodiments for the agent to remain at the same physical workspace such as the embodiments of architectures shown in FIGS. 10C-10E. Preferably, the agent uses the same computer workstation for reviewing account information and system commands for predictive dialing as for manual dialing in order to seamlessly transition from handling an automatically dialed call to handling a manually dialed call. Such a configuration avoids the agent from moving to another workspace location when handling a skip-trace call, and having to return to an original workspace location to continue handling automatically dialed calls. The same can be said for the telephone equipment used by the agent for conversing with individuals that have been dialed by the ADS and that have been manually dialed. This helps to minimize the agent impact when transitioning from an automatically dialed call to a manually dialed call, and back to an automatically dialed call.

Exemplary Computer Processing Device

Figure 15:
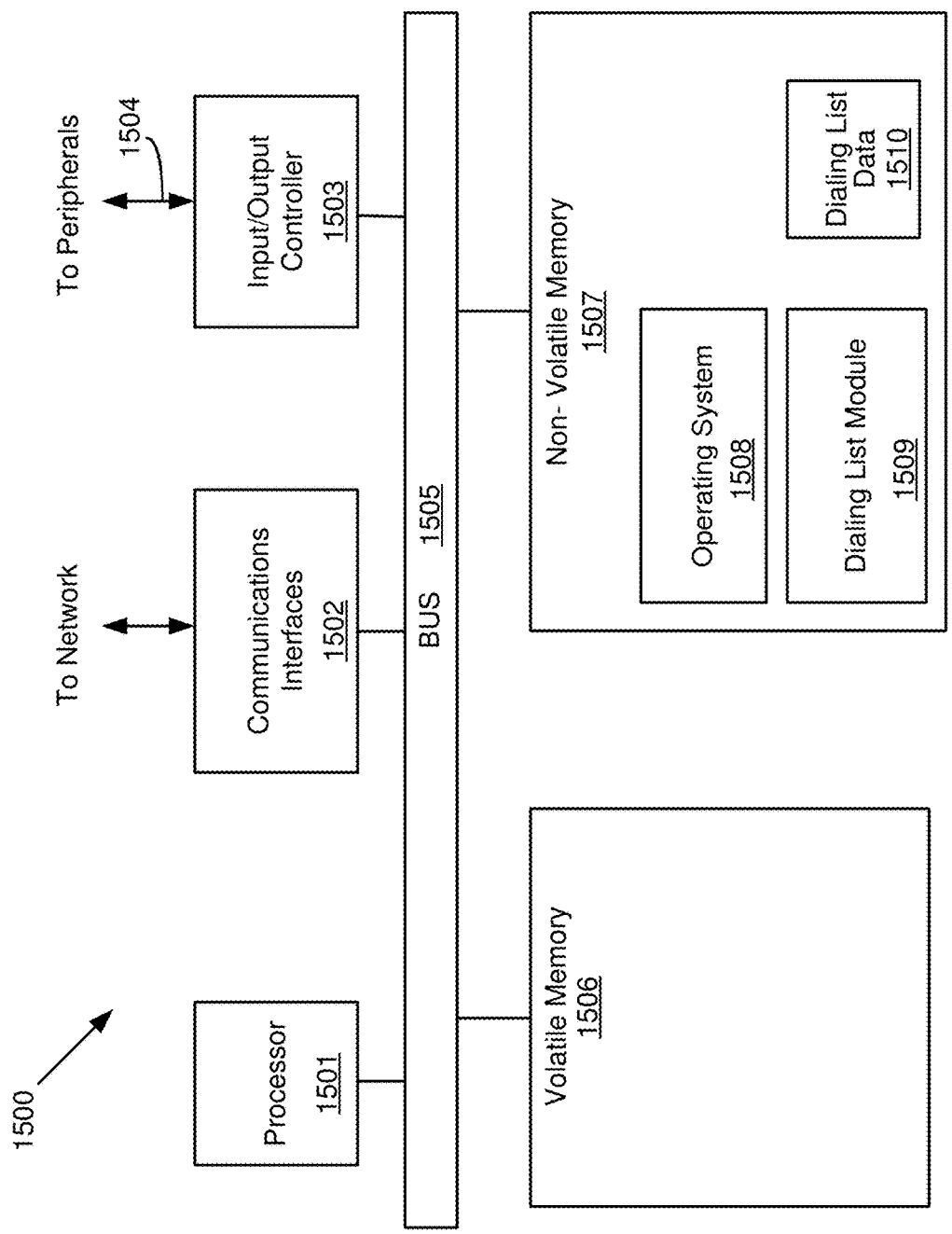
FIG. 15 illustrates an embodiment of a high level architecture of a processing system for practicing the concepts and technologies disclosed herein.

FIG. 15 is an exemplary schematic diagram of a computer processing system that may be used in an embodiment for any one of the components used in the contact center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 15, the processing system 1500 may include one or more processors 1501 that may communicate with other elements within the processing system 1500 via a bus 1505 or some other form of communication facility. The processor 1501 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1500 may also include one or more communications interfaces 1502 for communicating data via the local network with various external devices, including those shown in FIG. 5 and FIGS. 10A-10E, as well as with skip-trace vendors. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

An input/output controller 1503 may also communicate with one or more input devices or peripherals using an interface 1504, such as, but not limited to: a keyboard, a mouse, a touch screen/display input, microphone, pointing device, etc. The input/output controller 1503 may also communicate with output devices or peripherals, such as displays, printers, speakers, headsets, banner displays, other components in the contact center, etc. These may be used, in part, to receive data, such as dialing lists retrieved from an external database.

The processor 1501 may be configured to execute instructions stored in volatile memory 1506, non-volatile memory 1507, or other forms of computer readable storage media accessible to the processor 1501. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1507 may store program code and data, which also may be loaded into the volatile memory 1506 at execution time. Specifically, the non-volatile memory 1507 may store a dialing list processing module 1509 that may perform the above mentioned process flows and/or operating system code 1508 containing instructions for performing the process and/or functions associated with the technologies disclosed herein. The dialing list module 1509 may also access various dialing list data 1510 disclosed above and process the related fields described above. The volatile memory 1506 and/or non-volatile memory 1507 may be used to store other information including, but not limited to: records, applications, programs, scripts, source code, object code, byte code, compiled code, interpreted code, machine code, executable instructions, or the like. These may be executed or processed by, for example, processor 1501. These may form a part of, or may interact with, the dialing list module 1509. In some embodiments, the dialing list module 1509 may be integrated in another component.

The technologies described herein may be implemented in various ways, including as computer program products comprising memory storing instructions causing a processor to perform the operations associated with the above technologies. The computer program product comprises a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Conclusion

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A non-transitory computer readable medium storing instructions that when executed cause a computer processor to:
retrieve a dialing list comprising a plurality of records from a database, each record comprising a telephone number, one or more fields used to indicate whether the telephone number is subject to a prohibition of using an automated dialing system to dial the telephone number, and an identifier of an individual associated with the telephone number;

retrieve a first record from the plurality of records in the dialing list;

determine the telephone number of the first record should be manually dialed based on the one or more fields of the first record indicating the telephone number of the first record is subject to the prohibition of using the automated dialing system to dial the telephone number of the first record;

provide the telephone number of the first record to a computer for display to an agent of a contact center for manual dialing;

receive a disposition code from the computer entered by the agent after the agent has conversed with an answering party of a call established by the agent manually dialing the telephone number of the first record; and in response to receiving the disposition code from the computer:

retrieve a second record from the plurality of records in the dialing list;

determine the telephone number of the second record can be dialed by the automated dialing system based on the one or more fields of the second record indicating the telephone number of the second record is not subject to the prohibition of using the automated dialing system to dial the telephone number of the second record; and cause the automatic dialing system to originate a second call to the telephone number of the second record.

2. The non-transitory computer readable medium of claim 1, wherein the one or more fields of the first record indicate that the telephone number of the first record is a wireless number.

3. The non-transitory computer readable medium of claim 2, wherein the one or more fields of the first record indicate consent was not obtained from the individual associated with the telephone number of the first record to manually dial the wireless number.

4. The non-transitory computer readable medium of claim 1, wherein the automatic dialing system is a predictive dialer.

5. The non-transitory computer readable medium of claim 1, wherein the automatic dialing system is a private branch exchange.

6. The non-transitory computer readable medium of claim 1, further storing instructions that when executed cause the computer processor to:

provide the telephone number of the second record to the automatic dialing system.

7. The non-transitory computer readable medium of claim 1, further storing instructions that when executed cause the computer processor to:

in response to receiving the disposition code, modify the one or more fields of the first record to reflect the telephone number of the first record is not subject to the prohibition of using the automated dialing system to dial the telephone number of the first record.

8. The non-transitory computer readable medium of claim 7, further storing instructions that when executed cause the computer processor to:

at a subsequent time after modifying the one or more fields of the first record to reflect the telephone number of the first record is not subject to the prohibition of using the automated dialing system to dial the telephone number of the first record:

retrieve the first record from the plurality of records in the dialing list;

determine the telephone number of the first record can be dialed by the automated dialing system based on the one or more fields of the first record indicating the telephone number of the first record is not subject to the prohibition of using the automated dialing system to dial the telephone number of the first record; and cause the automatic dialing system to originate a third call to the telephone number of the first record.

9. The non-transitory computer readable medium of claim 1, further storing instructions that when executed cause the computer processor to:

modify the second record retrieved from the dialing list in response to detecting tones generated by a telecommunication service provider processing the second call indicating the corresponding telephone number is no longer in service or has been disconnected, whereby the modified second record is not processed for either manual dialing or dialing by the automatic dialing system.

10. A method for processing a dialing list by a contact center, comprising:

retrieving the dialing list comprising a plurality of records from a database by an automated dialing system, each record comprising a corresponding telephone number and one or more fields indicating the corresponding telephone number may be dialed by the automatic dialing system, wherein a corresponding individual is associated with each record;

determining by using the one or more fields of a particular record that the corresponding telephone number of the particular record should be manually dialed based on the one or more fields;

providing the corresponding telephone number of the particular record to a computer for display to an agent in the contact center;

originating a call from the contact center by a voice switch in response to the agent manually dialing the corresponding telephone number of the particular record, wherein digits of the corresponding telephone number are sent from a telephone device used by the agent to the voice switch in the contact center processing the call, wherein the voice switch is separate from the automated dialing system, and wherein the call is answered by an answering party;

receiving at the automated dialing system a disposition code for the call from the computer used by the agent, the disposition code indicating the agent, after manually dialing the call, verified with the answering party that the corresponding telephone number of the particular record is authorized by the answering party to use the automated dialing system to subsequently contact the corresponding individual associated with the particular record;

in response to receiving the disposition code, modifying the particular record by the automated dialing system to reflect the corresponding telephone number of the particular record is to be dialed using the automated dialing system thereby creating a modified record; and storing the modified record by the automated dialing system.

11. The method of claim 10, further comprising:

retrieving the modified record from the dialing list by the automated dialing system at a subsequent time relative to storing the modified record;

analyzing the modified record by the automated dialing system after retrieving the modified record to determine whether the modified record indicates the corresponding telephone number for the modified record is to be dialed by the automated dialing system; and dialing the corresponding telephone number of the modified record by the automated dialing system in response to determining the modified record indicates the corresponding telephone number for the modified record is to be dialed by the automated dialing system.

12. The method of claim 10 further comprising:

determining by the automated dialing system that the one or more fields of the particular record indicates the corresponding telephone number of the particular record is a wireless number.

13. The method of claim 10, wherein originating the call from the contact center in response to the agent manually dialing the corresponding telephone number of the particular record comprises the agent entering a series of digits corresponding to the corresponding telephone number of the particular record on a telephone device, and the method further comprises providing a name of the corresponding individual to the computer for display to the agent.

14. The method of claim 13, wherein the telephone device transmits the series of digits corresponding to the telephone number to the voice switch that originates the call as a Voice over Internet Protocol ("VoIP") call.

15. The method of claim 10, wherein originating the call from the contact center in response to the agent manually dialing the corresponding telephone number of the particular record comprises the agent interacting with a telephone device comprising a soft-phone by selecting a series of digits corresponding to the corresponding telephone number of the particular record that are transmitted to the voice switch.

16. A non-transitory computer readable medium storing instructions that when executed cause a computer processor to:

retrieve a dialing list comprising a plurality of records from a database, each record comprising a corresponding telephone number, one or more fields of the particular record indicating whether the corresponding telephone number can be established using a predictive dialer under the control of the computer processor, and a corresponding identifier of a corresponding individual associated with the record;

analyze a particular record among the plurality of records to determine the one or more fields of the particular record indicates the corresponding telephone number of the particular record is to be predictively dialed by a predictive dialer or manually dialed by an agent;

determine that the corresponding telephone number of the particular record should be predictively dialed based on the corresponding one or more fields of the particular record indicating the corresponding telephone number of the particular record is to be predictively dialed;

cause the predictive dialer to originate a call from the contact center, wherein the call is answered by an answering party;

receive a disposition code from a computer used by the agent indicating the corresponding telephone number of the particular record should not be predictively dialed in the future;

modify the one or more fields of the particular record in response to receiving the disposition code to reflect the corresponding telephone number of the particular record should not be predictively dialed in the future thereby creating a modified particular record; and store the modified particular record in memory.

17. The non-transitory computer readable medium of claim 16 further storing instructions that when executed cause a computer processor to:

retrieve the modified particular record from the database at a subsequent time;

determine that the corresponding telephone number of the modified particular record should be manually dialed based on the corresponding one or more fields of the particular record indicating the corresponding telephone number of the particular record is to be manually dialed by an agent; and cause the corresponding telephone number to be displayed on a computer used by the agent for manual dialing.

18. The non-transitory computer readable medium claim 16, wherein the disposition code received from the computer used by the agent indicates an answering party revoked consent to be dialed using an automatic dialing system.

19. A non-transitory computer readable medium storing instructions that when executed cause a computer processor to:

retrieve a dialing list comprising a plurality of records from a database, each record comprising a corresponding telephone number, one or more fields of the particular record indicating whether the corresponding telephone number can be established by manual dialing by an agent or using a predictive dialer under the control of the computer processor, and a corresponding identifier of a corresponding individual associated with the record;

analyze a particular record among the plurality of records to determine the one or more fields of the particular record indicates the corresponding telephone number of the particular record is to be predictively dialed by the predictive dialer or manually dialed by the agent;

determine that the corresponding telephone number of the particular record should be manually dialed based on the corresponding one or more fields of the particular record indicating the corresponding telephone number of the particular record is to be manually dialed;

provide the corresponding telephone number to a computer for display to the agent;

receive a disposition code from the computer used by the agent indicating the corresponding telephone number of the particular record may be predictively dialed in the future;

modify the one or more fields of the particular record in response to receiving the disposition code to reflect the corresponding telephone number of the particular record may be predictively dialed in the future thereby creating a modified particular record; and stored the modified particular record in memory.

20. The non-transitory computer readable medium of claim 19 further storing instructions that when executed cause a computer processor to:

retrieve the modified particular record from the database at a subsequent time;

determine that the corresponding telephone number of the modified particular record should be predictively dialed based on the corresponding one or more fields of the particular record indicating the corresponding telephone number of the particular record is to be predictively dialed using a predictive dialer; and cause the predictive dialer to establish a call to the corresponding telephone number.

\* \* \* \* \*